United States Patent
Kochevar-Cureton et al.

(10) Patent No.: US 10,831,523 B2
(45) Date of Patent: Nov. 10, 2020

(54) RDMA WITH VIRTUAL ADDRESS SPACE

(71) Applicant: MICROSOFT TECHNOLOGY LICENSING, LLC, Redmond, WA (US)

(72) Inventors: Alec Kochevar-Cureton, Bellevue, WA (US); Somesh Chaturmohta, Redmond, WA (US); Norman C. Lam, Sammamish, WA (US); Sambhrama Madhusudhan Mundkur, Sammamish, WA (US); Daniel M. Firestone, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 16/154,363

(22) Filed: Oct. 8, 2018

(65) Prior Publication Data
US 2020/0110626 A1 Apr. 9, 2020

(51) Int. Cl.
*G06F 9/46* (2006.01)
*G06F 9/455* (2018.01)
(Continued)

(52) U.S. Cl.
CPC .... *G06F 9/45558* (2013.01); *G06F 15/17331* (2013.01); *H04L 12/4645* (2013.01);
(Continued)

(58) Field of Classification Search
CPC .......... G06F 9/45558; G06F 15/17331; G06F 2009/45583; G06F 2009/45595; H04L 12/4645
(Continued)

(56) References Cited

U.S. PATENT DOCUMENTS 8,700,724 B2 * 4/2014 McDaniel ............... G06F 13/28
709/212
8,930,690 B2 * 1/2015 Zuo ........................ H04L 47/20
713/162
(Continued)

FOREIGN PATENT DOCUMENTS

WO 2018119774 A1 7/2018

OTHER PUBLICATIONS

Firestone et al., "Azure Accelerated Networking: SmartNICs in the Public Cloud.4", Apr. 2018, USENIX Association, pp. 51-64 (Year: 2018).*
(Continued)

*Primary Examiner* — Ted T. Vo
(74) *Attorney, Agent, or Firm* — Newport IP, LLC; Han Gim

(57) ABSTRACT

Techniques are disclosed for implementing direct memory access in a virtualized computing environment. A memory access policy of the virtualized computing environment is applied to a direct memory access connection request received from a first virtual machine via an exception path. The request is flagged to indicate that the request has been processed and the request is forwarded to a network interface device configured to execute offloaded network functions for one or more virtual machines. A memory access policy of the virtualized computing environment is applied to a direct memory access connection reply received from a second virtual machine on the exception path. The reply is flagged to indicate that the reply has been processed and the reply is forwarded to the network interface device. A direct memory access connection is established between first and second virtual machines in accordance with the request.

20 Claims, 20 Drawing Sheets

(51) Int. Cl.
*G06F 15/173* (2006.01)
*H04L 12/46* (2006.01)

(52) U.S. Cl.
CPC .............. *G06F 2009/45583* (2013.01); *G06F 2009/45595* (2013.01)

(58) Field of Classification Search
USPC ........................................ 718/104, 107, 108
See application file for complete search history.

(56) References Cited

U.S. PATENT DOCUMENTS

| | | | |
|---|---|---|---|
| 9,813,338 B2* | 11/2017 | Sajeepa | ................. H04L 45/745 |
| 10,437,775 B2* | 10/2019 | Kochevar-Cureton | ...................... H04L 49/3027 |
| 2014/0297775 A1 | 10/2014 | Davda et al. | |
| 2017/0177396 A1 | 6/2017 | Palermo et al. | |
| 2019/0243552 A1* | 8/2019 | Maharana | ............... G06F 11/34 |

OTHER PUBLICATIONS

Guay et al., "Early experiences with live migration of SR-IOV enabled InfiniBand", 2015, Elsevier Inc., pp. 39-52 (Year: 2015).*
"International Search Report and Written Opinion Issued in PCT Application No. PCT/US2019/052535", dated Nov. 28, 2019, 11 Pages.
Pfefferle, et al., "A Hybrid I/O Virtualization Framework for ROMA-capable Network Interfaces", In Proceedings of the 11th ACM SIGPLAN/SIGOPS International Conference on Virtual Execution Environments, Mar. 2015, pp. 17-30.

* cited by examiner

RDMA WITH VIRTUAL ADDRESS SPACE

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

Remote direct memory access (RDMA) is a method for direct memory access from the memory of one computer into that of another without involving either operating system. This permits high-throughput, low-latency networking, which is especially useful in massively parallel computer clusters. RDMA for virtual machines requires network traffic to flow through network virtual functions. However, RDMA for virtual machines still requires both sender and receiver machines to have physically routable address spaces. It is with respect to these considerations and others that the disclosure made herein is presented.

SUMMARY

The disclosed embodiments describe technologies for enabling RDMA between a virtualized environment running virtual machines with virtual address spaces. Implementation of RDMA may allow data centers to enable high-throughput, low-latency networking in the data center, and thus more effectively adhere to operational objectives and at the same time improve operating efficiencies. Networking stacks are becoming increasingly complex as features are added and as network speeds increase, and running these stacks on CPU cores takes away processing power from virtual machines, increasing the cost of providing virtualized services, and adding latency and variability to network performance.

In some embodiments, host networking may be configured to offload tasks to hardware devices. Some embodiments may include a device configured to perform computing and communications tasks that are offloaded from the CPU. The device may be a peripheral device including a processor and memory, and capable of performing many of the same tasks that are typically accomplished other devices such as the CPU. In some embodiments, the peripheral device may be a network communications device, such as a network interface card (NIC). Such a NIC may be referred to herein as a smartNIC or sNIC. In some embodiments, smartNICs may be include field programmable gate arrays (FPGAs). FPGAs are reconfigurable hardware devices composed of small generic logic blocks and memories, connected by a statically configured network. Code is written to assemble the generic logic and memory into soft logic circuits, forming custom application-specific processing engines. The use of technologies such as RDMA, sNICs, and FPGAs may improve the performance and cost of providing virtualized services.

A datacenter running virtual machines may implement virtual networks that are private networks and thus are not directly addressable outside of the private network. RDMA for virtual machines requires network traffic to flow through network virtual functions (VFs). However, RDMA for virtual machines requires both sender and receiver machines to have a physically routable address space. If the sender and receiver machines have a virtual address space, an additional network interface from a physically routable address space may be implemented for RDMA traffic. Implementation of RDMA may allow for low latency, high bandwidth for virtualized environments without the need to use the CPU for network operations.

To enable RDMA in virtual networks, in some embodiments the sNIC may be configured to perform data management functions such as encapsulating packets from the virtual space to packets that are routable in the physical network. Some virtualization systems may implement a synthetic virtualization of a network adapter, referred to as a synthetic network adapter or synthetic NIC. A synthetic NIC connects to a host's virtual switch, which allows the virtual machine to communicate to other virtual machines on the same virtual switch. Some virtualization systems may also augment NIC functionality with the FPGA. In one embodiment, the FPGA may operate between the NIC and the Top of Rack (TOR) switch, and the FPGA may operate as a filter on the network. The TOR switch may be referred to herein as TOR. The FPGA may implement Generic Flow Tables (GFT), which defines transformation and control operations on packets for network flows.

In one embodiment, to enable RDMA on virtual networks, the FPGA may perform the operations of the GFT to take the address space from the virtual networks and encapsulate them with the physical space addresses. Additionally, implementation of RDMA may include communications on virtual functions and not those on the synthetic NIC. However, policies of the host may reside on the host partition which may only communicate with virtual machines on the synthetic NIC. When an initial packet is received, the FPGA may not have information on the policies on actions to take with the packet, and may need to send the packet to the synthetic NIC which sends the packet to the host. The host may then process the packet and send it to the virtual machine. However, it is desirable to bypass the synthetic NIC to implement RDMA. In various embodiments further described herein, to implement RDMA in virtual networks, a function may be added to the FPGA to process packets and send the processed packets to the NIC.

In one embodiment, an implementation of an RDMA connection request includes the FPGA indicating a packet on an exception path which is processed by a virtual filtering platform (VFP): When the GFT on the FPGA does not know what to do with a packet, it adds the EXCEPTION VLAN ID to the packet and sends it to the NIC. The NIC sends it to the host after converting the VLAN information into Out of Band (OOB) information in the NBL. On the host, the GFTLWF driver converts appropriate OOB information into meaningful information for the VFP. The GFTLWF sends the packet to the VFP. The VFP processes the OOB and packet and goes through the process of building the action for the packet and initiating the packet offload if needed. The VFP may apply policies of the virtualization environment to the packet and send packets back to the FPGA with a flag that indicates that processing is complete and may be sent to the NIC. The FPGA may send the packet back to the NIC which is then delivered to the virtual machine via the virtual function.

In one embodiment, an implementation of an RDMA connection reply is described. The FPGA may indicate a packet on an exception path which is processed by the VFP. The VFP may apply policies of the virtualization environment to the packet and send packets back to the FPGA with a flag that indicates that processing is complete and may be sent to the TOR. The FPGA may send this packet to TOR.

In an embodiment, an implementation of RDMA for subsequent incoming packets is described. An incoming packet for may processed by the FPGA and delivered to virtual machine via a virtual function.

In an embodiment, an implementation of RDMA for an outgoing packet is described. Outgoing packets may be processed by FPGA and delivered to TOR By providing such a mechanism for implementing RDMA in virtual networks, data transfer via the network may be offloaded to the network interface hardware, freeing up the target host CPU to focus on the user's applications, while providing low-latency and high-throughput. This improves virtualized computing resources provide to end users, while providing for greater operational efficiency for service providers such as operators of virtual machines.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes technologies for implementing RDMA in data centers, including those that provide virtualized services. The implementation of RDMA can provide low-latency and high-throughput in the data center. However, it is also desirable to prioritize CPU resources for local tasks of user applications. In some embodiments, RDMA may be implemented in the users' virtual networks by offloading the network data transfers to peripherals such as the smartNIC and augmentations using programmable logic such as FPGA, thus freeing up the host CPU to focus on the user's applications.

Remote Direct Memory Access (RDMA) is the ability for one machine to directly access the memory of another machine without using the operating system networking stack of either machine, thus allowing for high-throughput, low-latency data transfers. In virtualized environments, users may be provided a way to establish virtual networks with subnets in which virtual machines in the same virtual network can communicate. Communications in virtual networks may require that packets be encapsulated and decapsulated upon leaving or arriving at a virtual machine. In various embodiments disclosed herein, the network processing stack, such as in the hardware and software on the host machine, may be configured to recognize and correctly process RDMA data between two virtual machines.

The described methods and systems may implement techniques for implementing RDMA traffic between two virtual networks in the same or different subnet, and in some embodiments, RDMA traffic between paired virtual networks in the same virtualized system region. In some embodiments, the virtualized environment may implement smartNICs and programmable logic such as FPGA that are configured to support RDMA.

The improvements and efficiencies provide for greater usability, allowing for low-latency and high-throughput in a data center that provides virtualized services while prioritizing CPU resources for local tasks of user applications. The disclosed techniques may be implemented in any type of networked environment, including those that provide virtualized computing and network resources.

Figure 1:
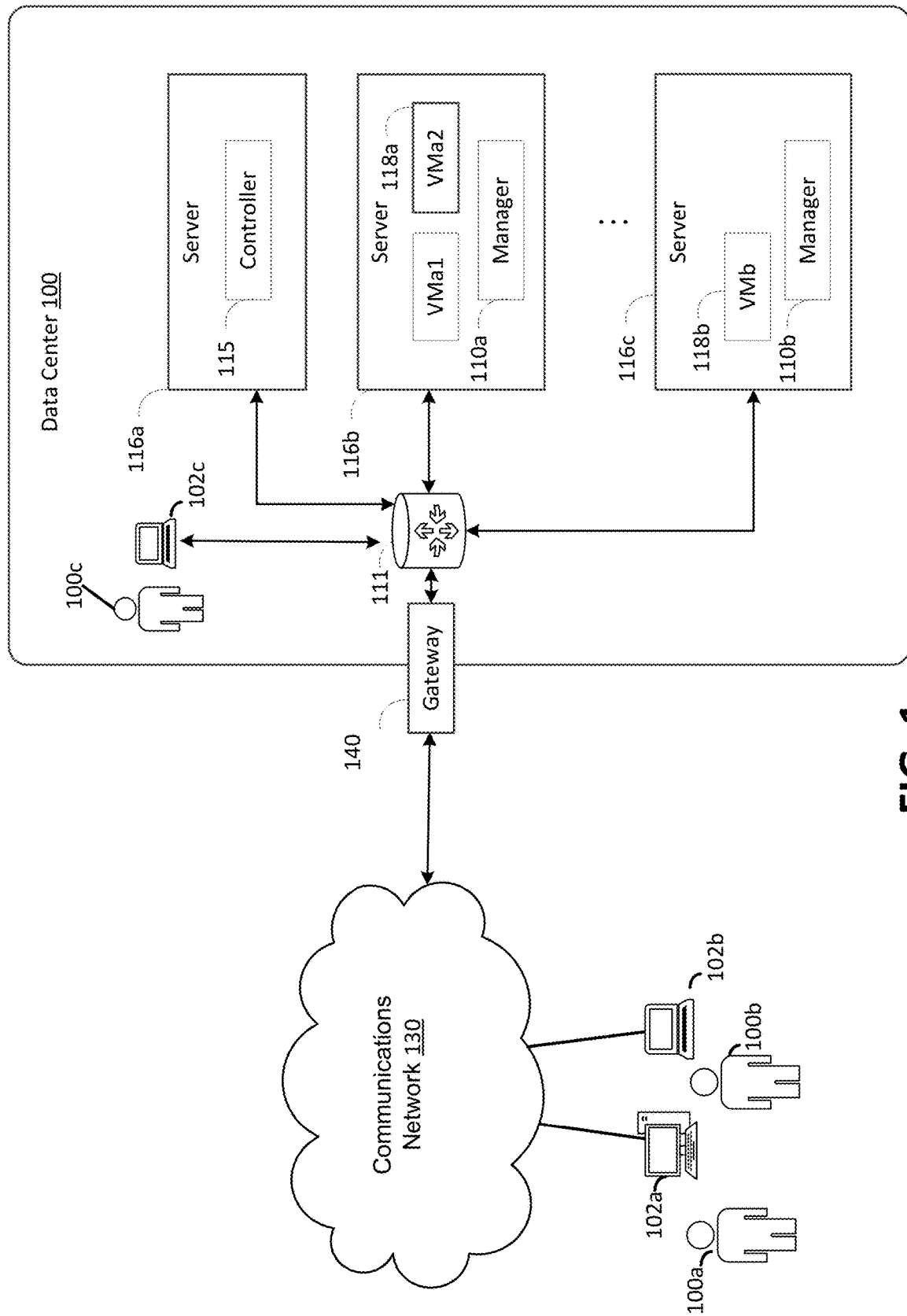
FIG. 1 is a diagram illustrating a data center in accordance with the present disclosure.

FIG. 1 illustrates an example computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
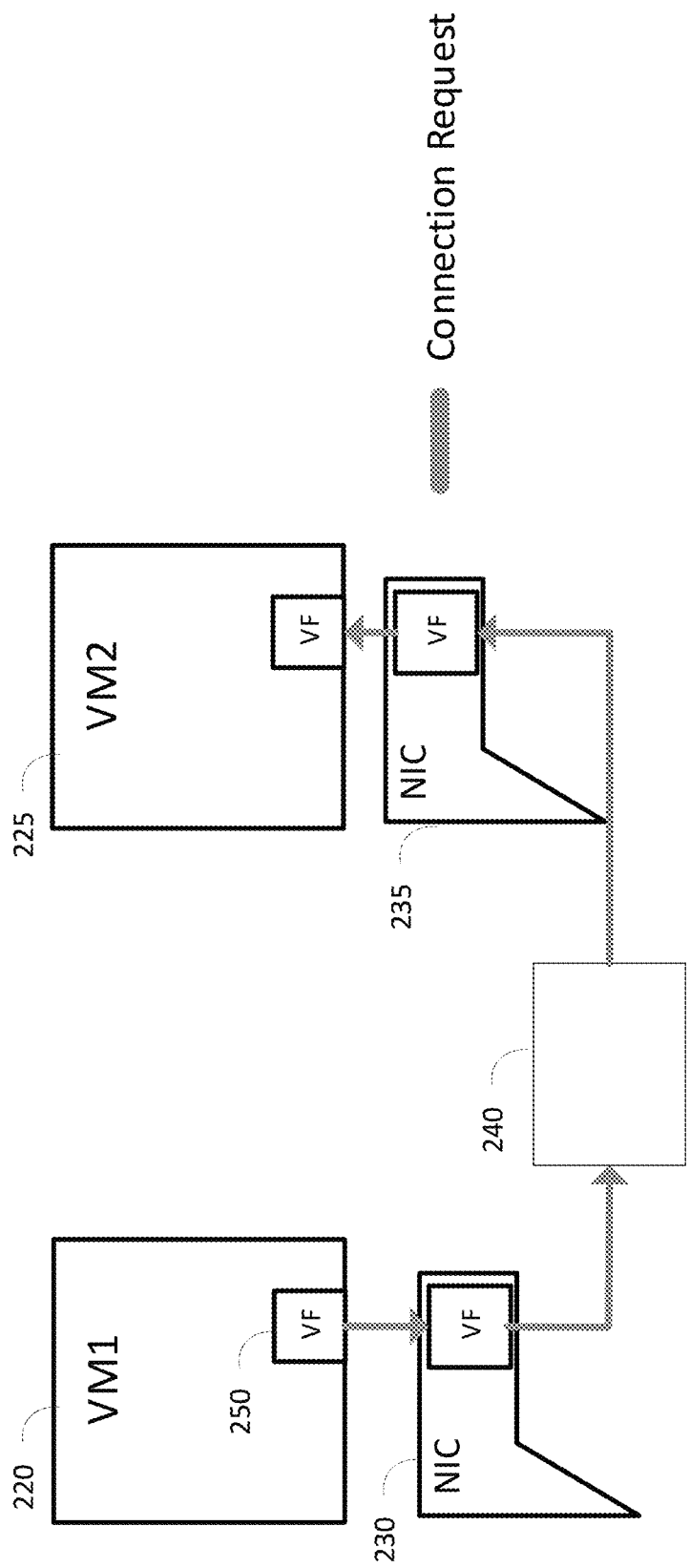
FIG. 2 is a diagram illustrating aspects of RDMA in accordance with the present disclosure.
Figure 3:
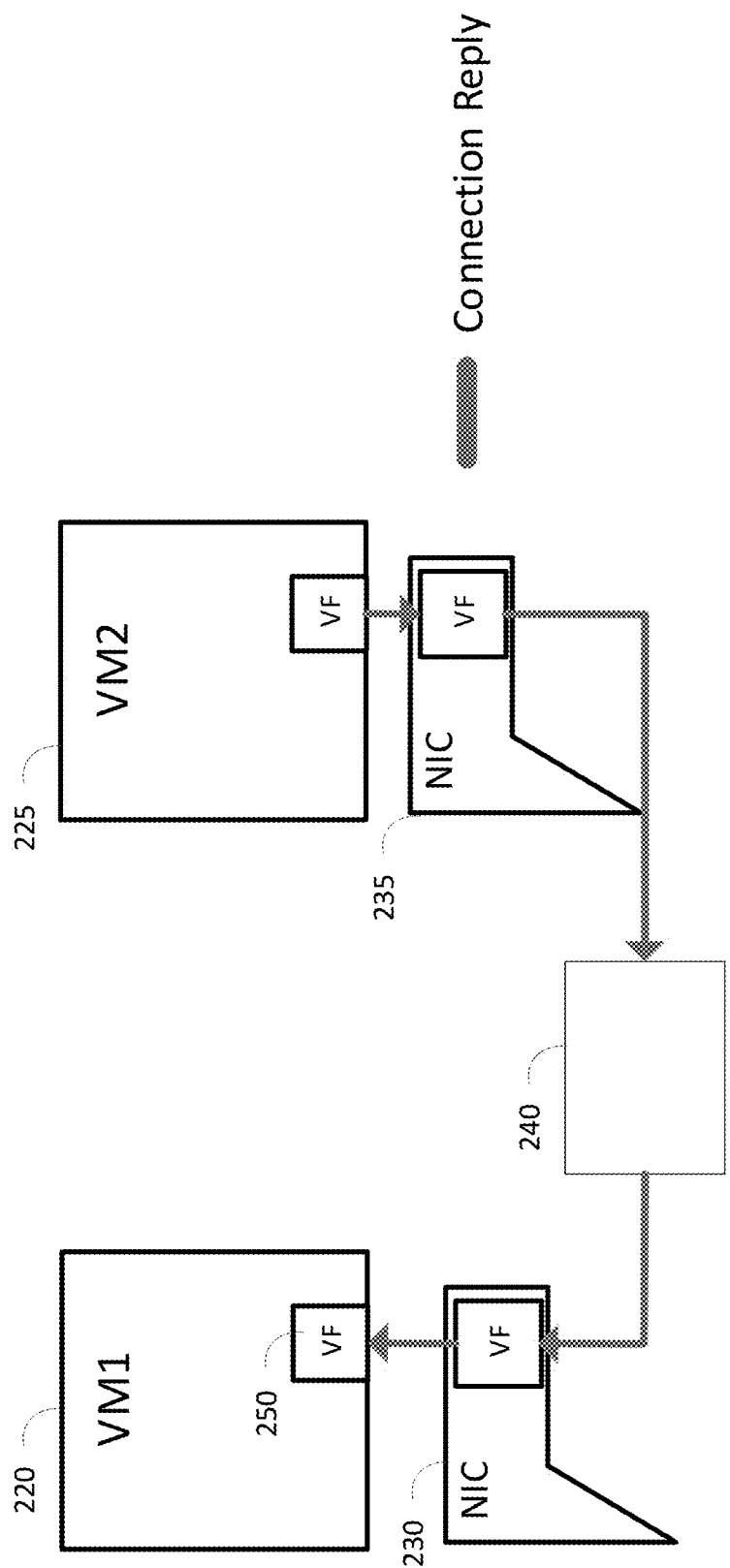
FIG. 3 is a diagram illustrating aspects of RDMA in accordance with the present disclosure.
Figure 4:
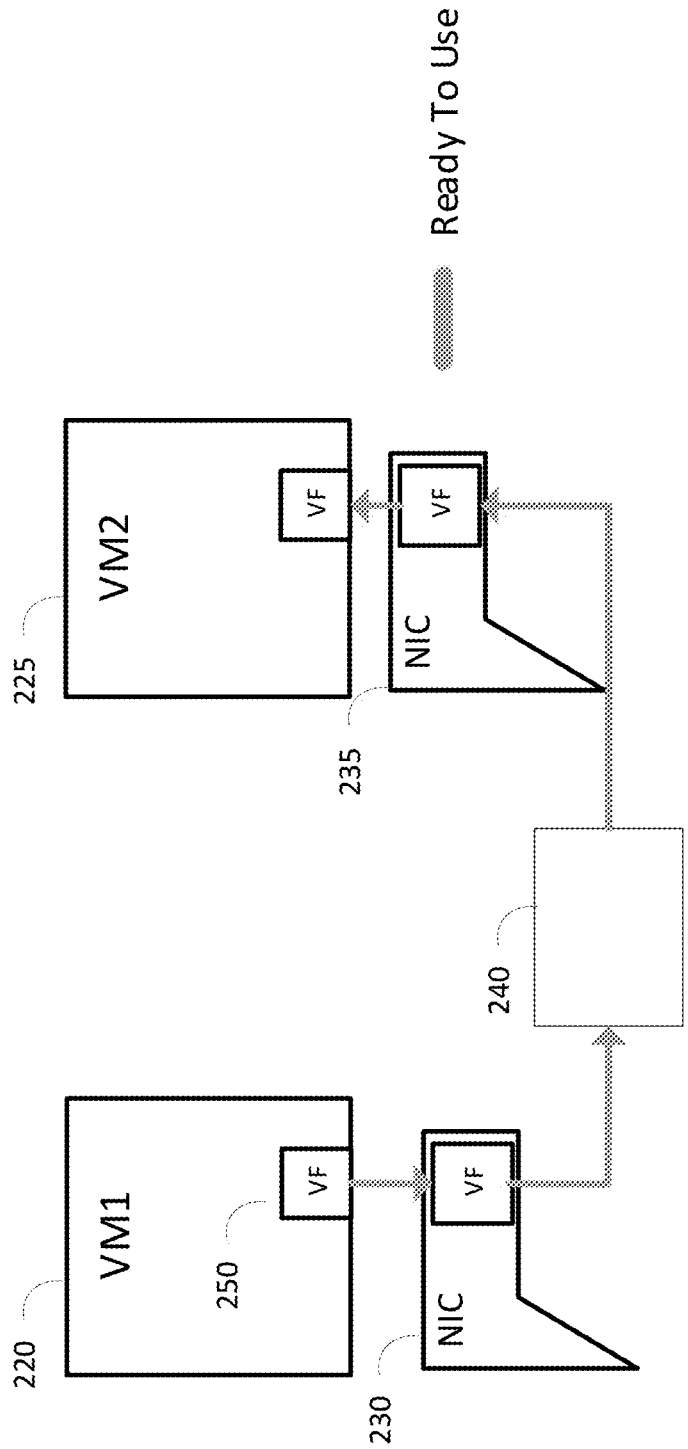
FIG. 4 is a diagram illustrating aspects of RDMA in accordance with the present disclosure.

In one embodiment, a process is disclosed for establishing a flow and offloading RDMA packet handling between two virtual machines. FIGS. 2-4 illustrate generally establishing an RDMA connection. Referring to FIG. 2, the figure illustrates sending a connection request. VM1 220 initiates a request to VM2 225 via network device 240. In an embodiment, a connection may be established via a 3-way handshake: connection request, connection reply, and ready to use. Referring to FIG. 3, the figure illustrates send a connection reply. VM1 905 220 receives a connection reply from VM2 225. Referring to FIG. 4, the figure illustrates sending a ready-to-use. VM1 905 220 sends a ready-to-use to VM2 225.

Figure 5:
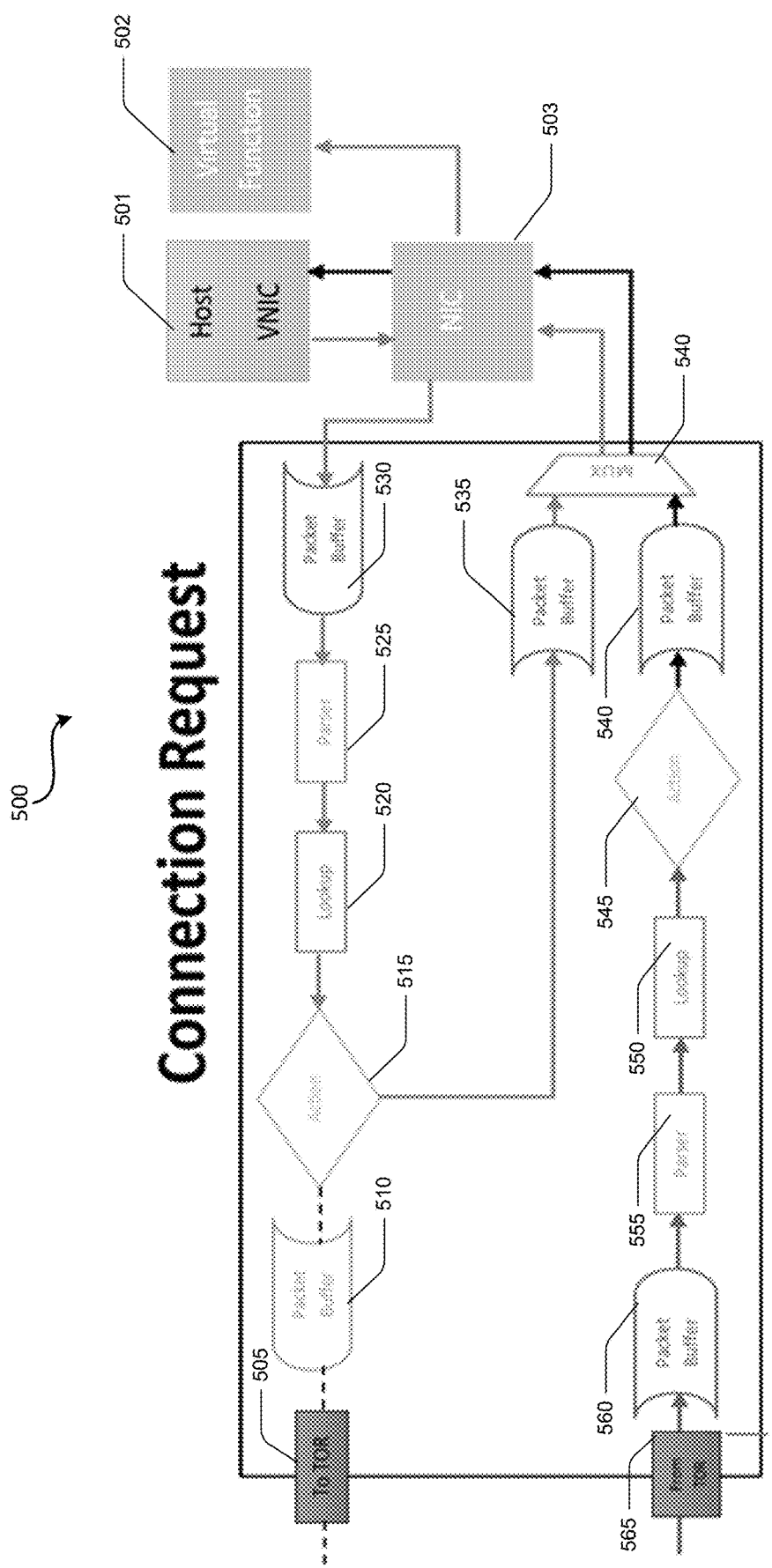
FIG. 5 is a diagram illustrating an RDMA connection request in accordance with the present disclosure.

Referring to FIG. 5, in one embodiment, an implementation of an RDMA connection request is described. The FPGA may indicate a packet on an exception path which may be processed by a virtual filtering platform (VFP). The VFP may apply policies of the virtualization environment to the packet and send packets back to the FPGA with a special flag that indicates that processing is complete and may be sent to the NIC. The FPGA may send the packet back to the NIC which is then delivered to the virtual machine via the virtual function.

Figure 6:
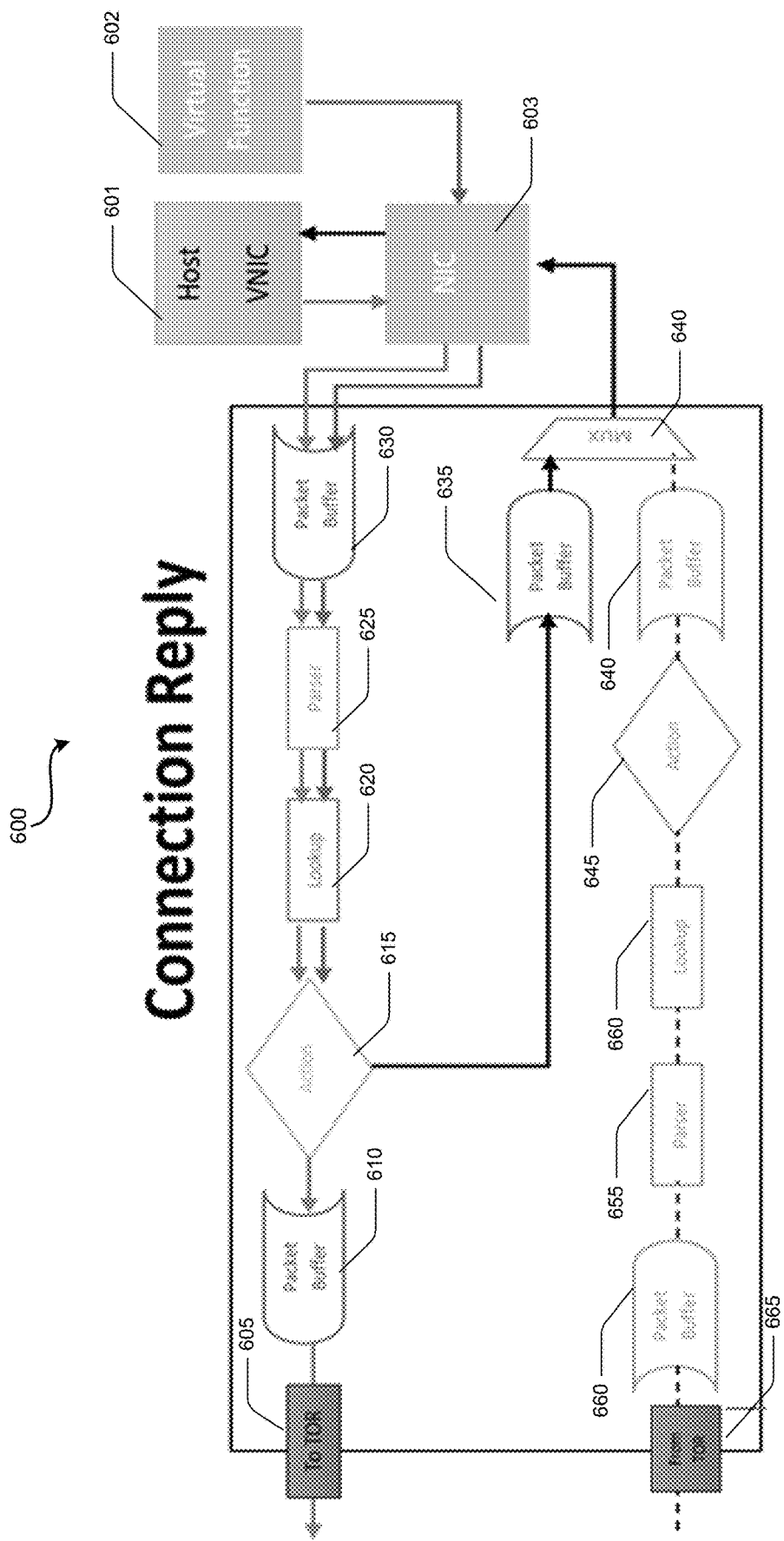
FIG. 6 is a diagram illustrating an RDMA connection reply in accordance with the present disclosure.

Referring to FIG. 6, in one embodiment, an implementation of an RDMA connection reply is described. The FPGA may indicate a packet on an exception path which is processed by the VFP. The VFP may apply policies of the virtualization environment to the packet and send packets back to the FPGA with a special flag that indicates that processing is complete and may be sent to the TOR. The FPGA may send this packet to TOR.

Figure 7:
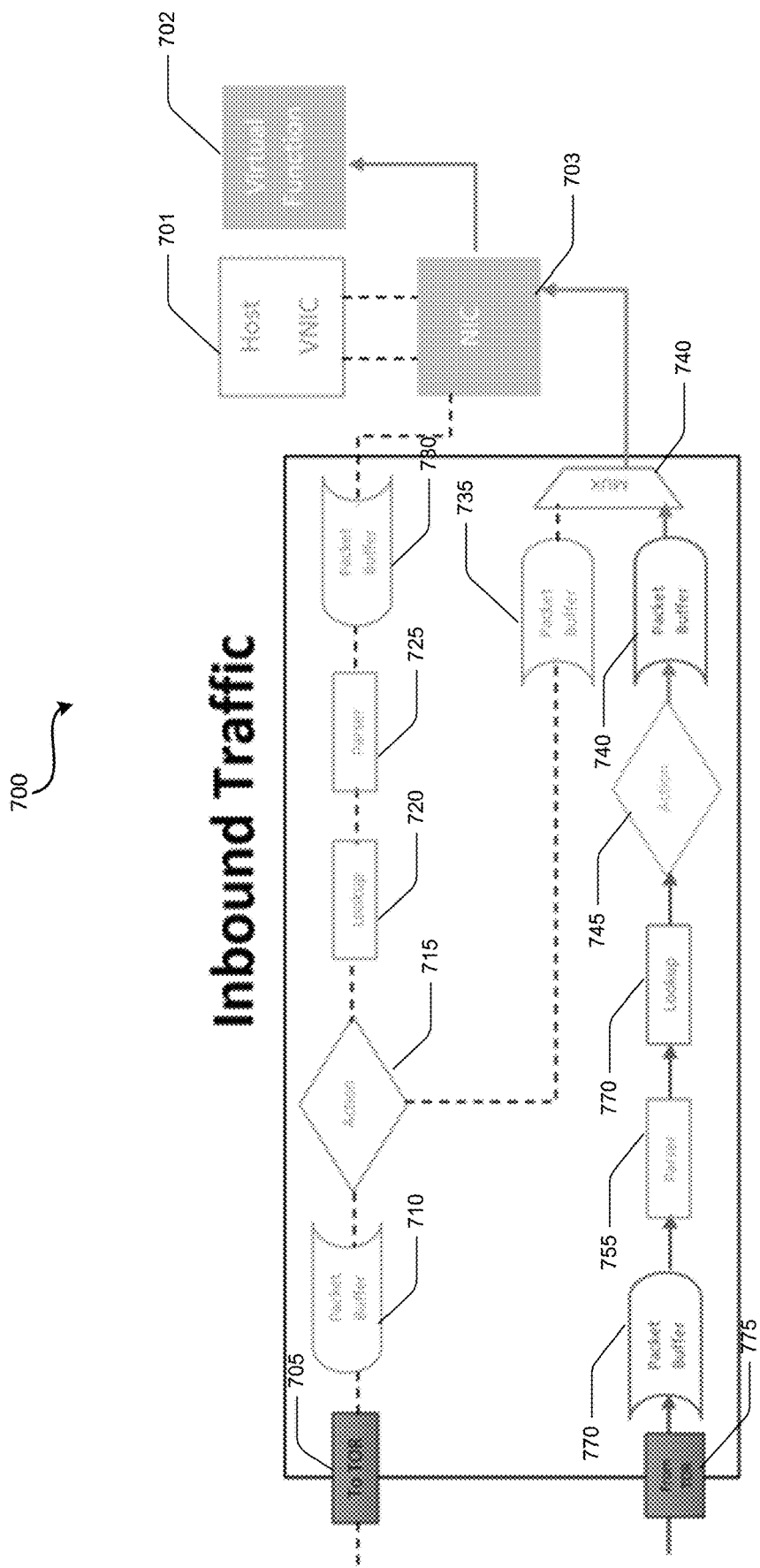
FIG. 7 is a diagram illustrating RDMA inbound traffic in accordance with the present disclosure.

Referring to FIG. 7, in one embodiment, an implementation of RDMA for subsequent incoming packets is described. An incoming packet for may processed by the FPGA and delivered to virtual machine via a virtual function.

Figure 8:
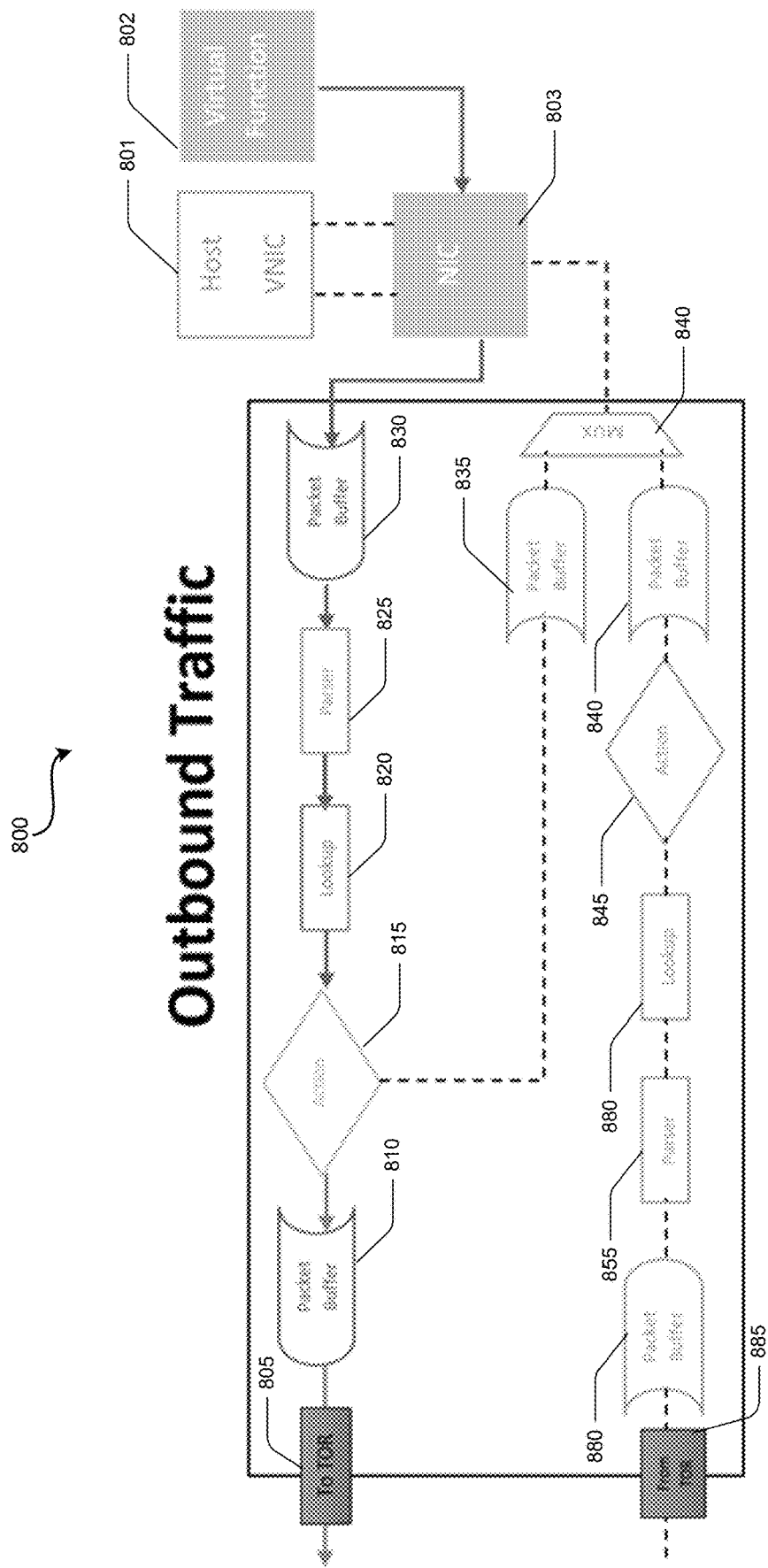
FIG. 8 is a diagram illustrating RDMA outbound traffic in accordance with the present disclosure.

Referring to FIG. 8, in one embodiment, an implementation of RDMA for an outgoing packet is described. Outgoing packets may be processed by FPGA and delivered to TOR.

Figure 9:
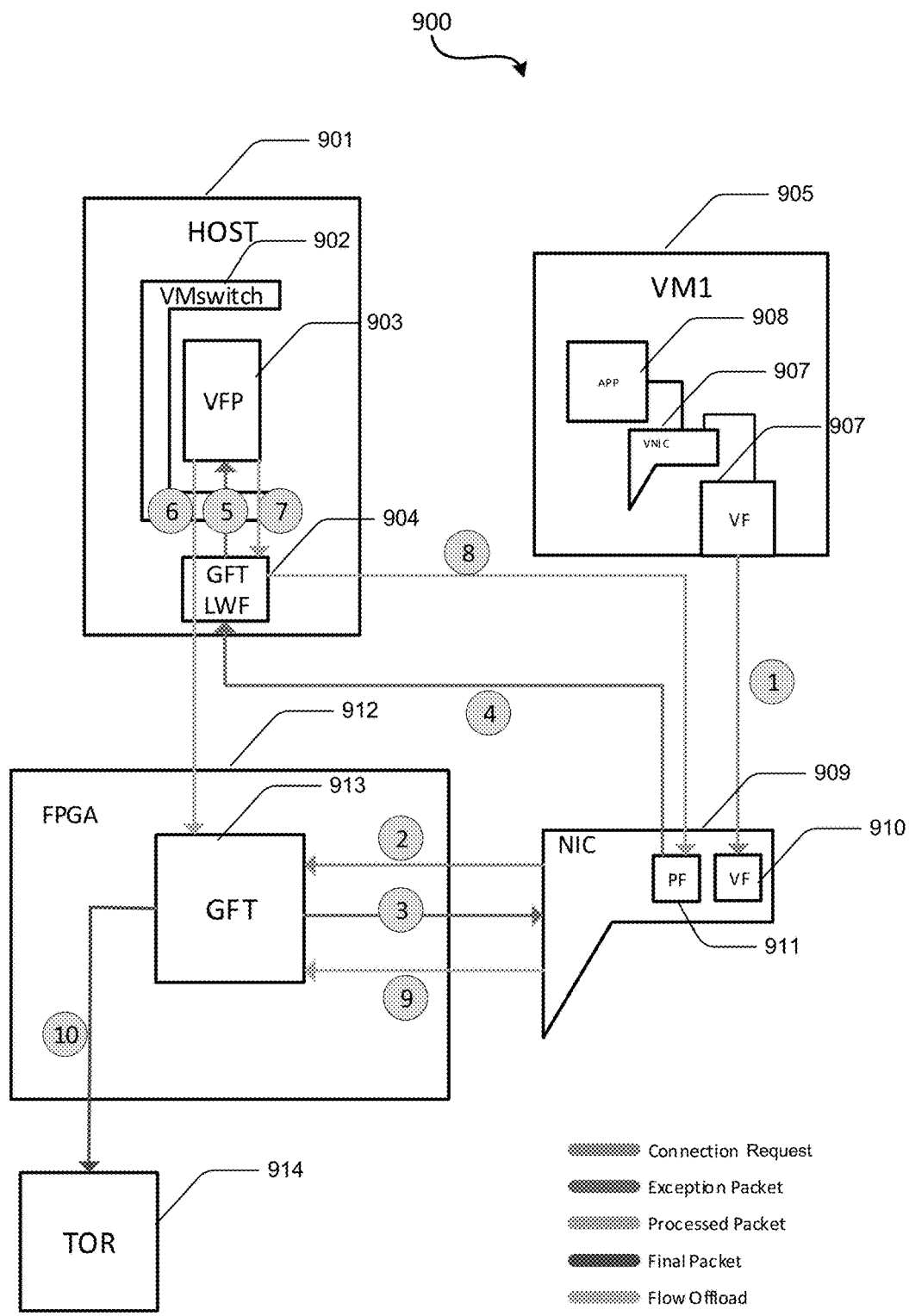
FIG. 9 is a diagram illustrating RDMA implementation in a virtualized environment in accordance with the present disclosure.

Referring to FIG. 9, the connection request outbound from VM1 905 is described. (1) VM1 905 sends out an initial connection request packet to the NIC 909 via its Virtual Function (VF 907). (2) NIC 909 forwards the packet to the FPGA 912. (3) It may be determined that the GFT 913 does not have a matching flow entry for this packet. An exception path may be executed. The packet may be marked as an exception by adding a VLAN tag and sending it back to the NIC 909. (4) The exception may be detected by the NIC 909 and sent out to the GFT LWF 904 via its Physical Function (PF). The GFT LWF 904 may be a GFT lightweight filter which augments the NIC 909 driver and is configured to abstract the details of the NIC 909 and FPGA 912 to make the smartNIC appear as a single NIC. (5) The GFT LWF 904 may strip the VLAN Tag, mark the packet as an exception, and send it to the Virtual Filtering Platform (VFP 903) which may be an implementation of a virtual switch. (6) The VFP 903 may apply policies of the virtualization environment to the packet. For example, the VFP 903 may parse the packet, create an OUT UF (Unified Flow), and offload the flow to the GFT 913 via the GFT LWF 904. (7) The VFP 903 may apply actions to the packet, mark the packet as "processed", and send it to GFT LWF 904. (8) The GFT LWF 904 may add a "processed" VLAN tag and send the packet to the NIC 909. (9) The NIC 909 forwards the packet to the FPGA 912. (10) The GFT 913 recognizes the packet as processed and removes the VLAN tag before sending it to the TOR 914.

Figure 10:
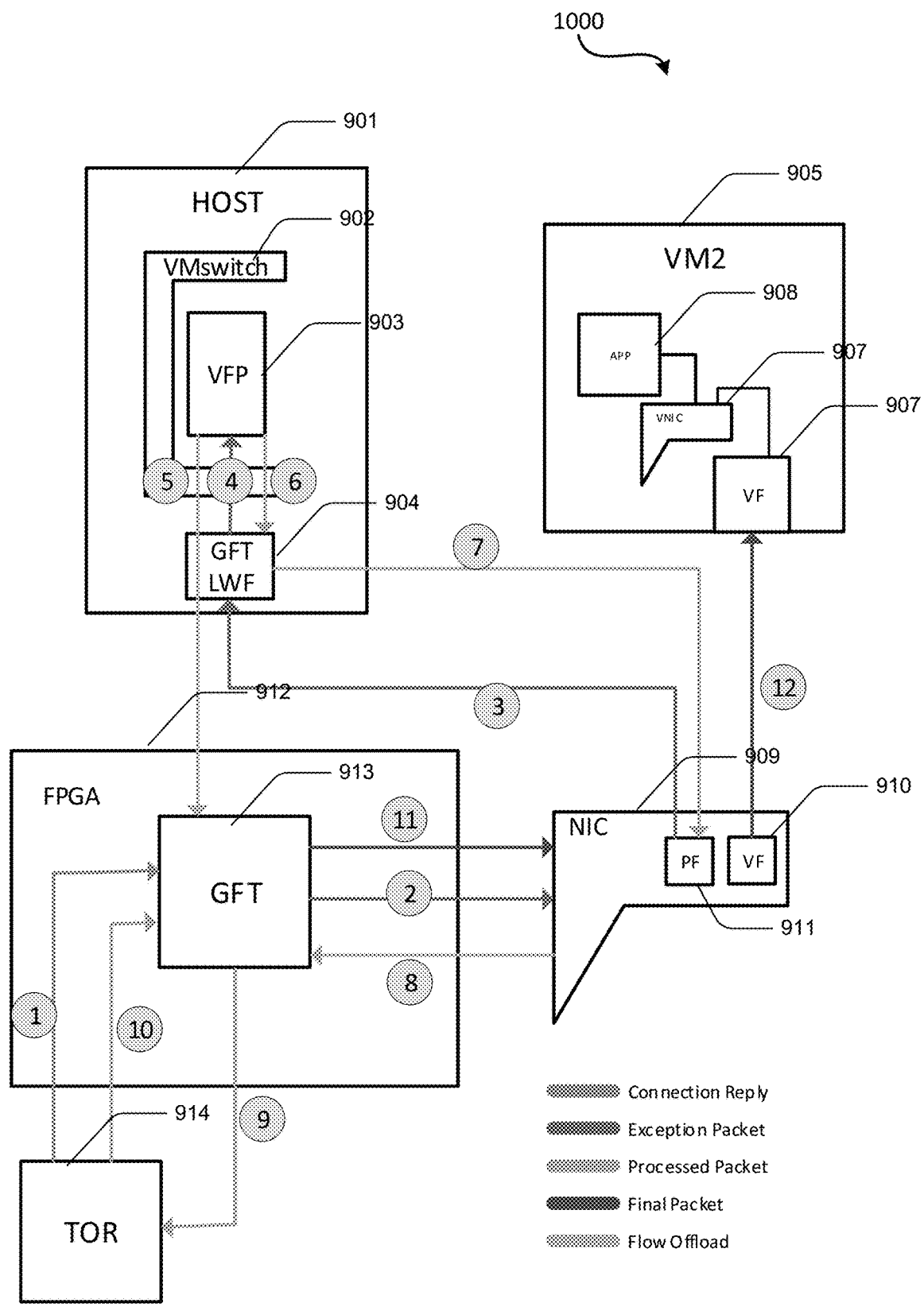
FIG. 10 is a diagram illustrating RDMA implementation in a virtualized environment in accordance with the present disclosure.

FIG. 10 illustrates further details of the inbound connection request. (1) A packet comes in from the TOR 914 and is forwarded to the FPGA 912. (2) An exception path may be executed. The GFT 913 determines that it does not contain a matching rule for this packet, and the packet is marked as an exception packet (VLAN TAG) and the packet is sent to the NIC 909. (3) The exception is processed by the NIC 909 and the packet is sent to the GFT LWF 904 via the PF 911. (4) The GFT LWF 904 removes the VLAN tag and marks the packet as an exception before sending it to the VFP 903. (5) The VFP 903 parses the packet, creates an IN UF, and offloads this flow to the GFT 913 via the GFT LWF 904. (6) After the UF is successfully offloaded to the GFT 913, the VFP 903 sends the packet to the GFT LWF 904 without applying actions to the packet. (7) The GFT LWF 904 marks the packet as processed by adding a VLAN tag and then sends it to the NIC 909. (8) The NIC 909 forwards the packet to the FPGA 912. (9) The GFT 913 determines that the packet is processed, removes the VLAN Tag, and sends it off to the TOR 914. (10) The TOR 914 then sends the packet back to the FPGA 912. (11) At this point, the GFT 913 has the matching UF for this packet and applies the actions to the packet and sends it to the NIC 909. (12) The NIC 909 forwards the packet to the VM via the VF 907.

Figure 11:
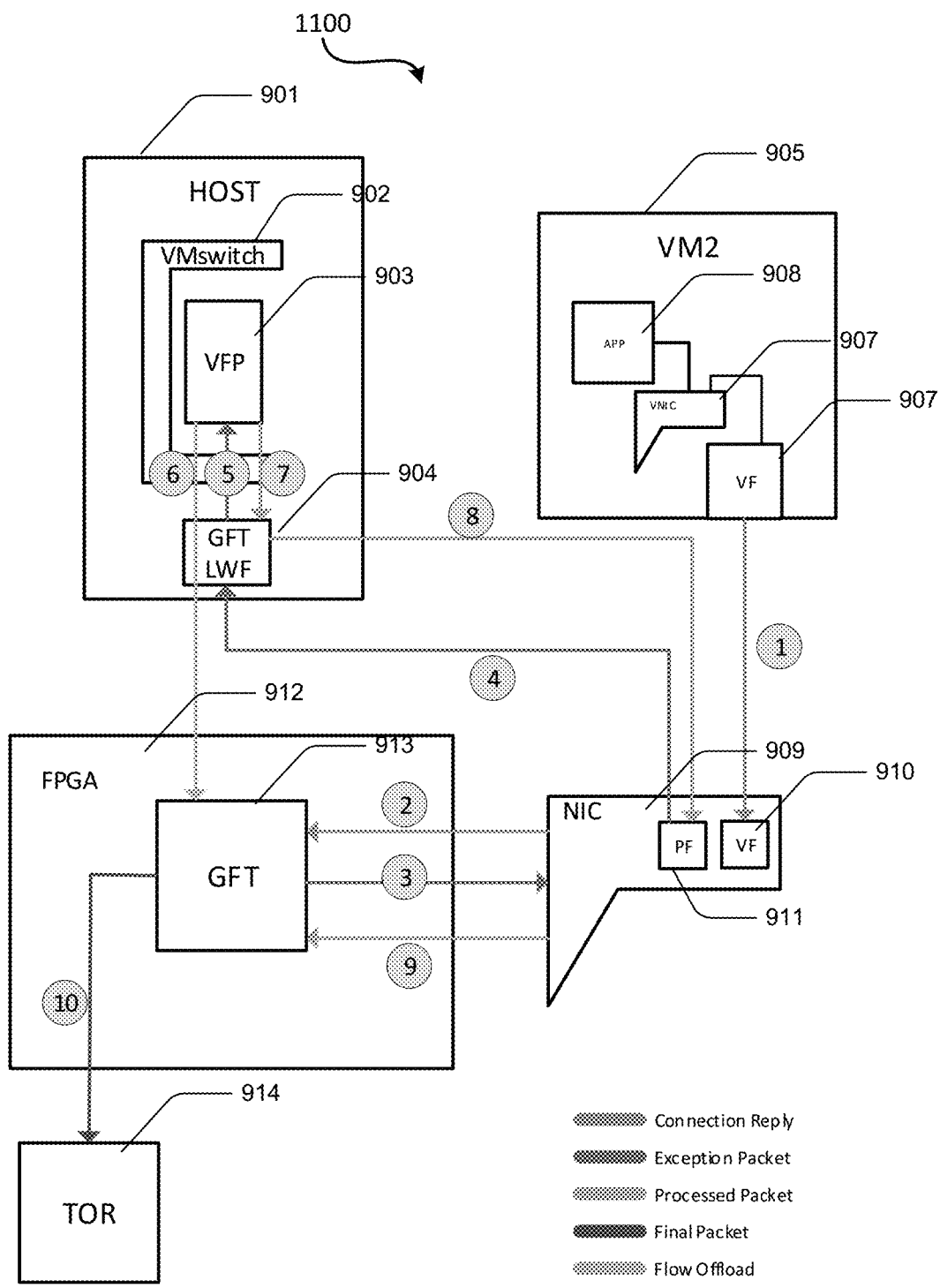
FIG. 11 is a diagram illustrating RDMA implementation in a virtualized environment in accordance with the present disclosure.

FIG. 11 illustrates an example outbound connection RDMA packet. (1) VM2 sends out a connection reply packet to NIC 909 via its VF 907. (2) The NIC 909 forwards the packet to FPGA 912. An exception path may be executed. (3) GFT 913 determines that it does not have a matching flow entry for this packet, so the packet is marked as an exception by adding a VLAN tag. The packet is sent back to NIC 909. The exception is seen by NIC 909 and sent out to the GFT LWF 904 via its PF. In one embodiment, NIC 909 removed the VLAN Tag from the packet and converts it to OOB data for GFT LWF 904. (5) GFT LWF 904 modifies the VLAN Tag, marks the packet as an exception, and sends it to VFP 903. In one embodiment, GFT LWF 904 converts the OOB representation of the VLAN tag to OOB data recognized by VFP 903. In some implementations, NIC 909 performs the conversion between VLAN and OOB, and GFT LWF 904 converts between miniport specific OOB and VFP OOB information. VFP 903 applies policies of the virtualization environment to the packet. For example, the VFP 903 parses the packet, creates an OUT UF, and offloads the flow to GFT 913 via GFT LWF 904. (7) VFP 903 applies necessary actions to the packet, marks the packet as processed, and sends the packet to GFT LWF 904. (8) GFT LWF 904 adds a "processed" VLAN tag and sends the packet to NIC 909. (9) NIC 909 forwards the packet to FPGA 912. (10) GFT 913 recognizes the packet as processed and removes the VLAG tag before sending it to TOR 914. the NIC that does the conversion between VLAN and OOB. The specific ordering of the described procedure and the components that perform the operations may vary. For example, GFT LWF 904 may convert between miniport specific OOB and VFP OOB information.

Figure 12:
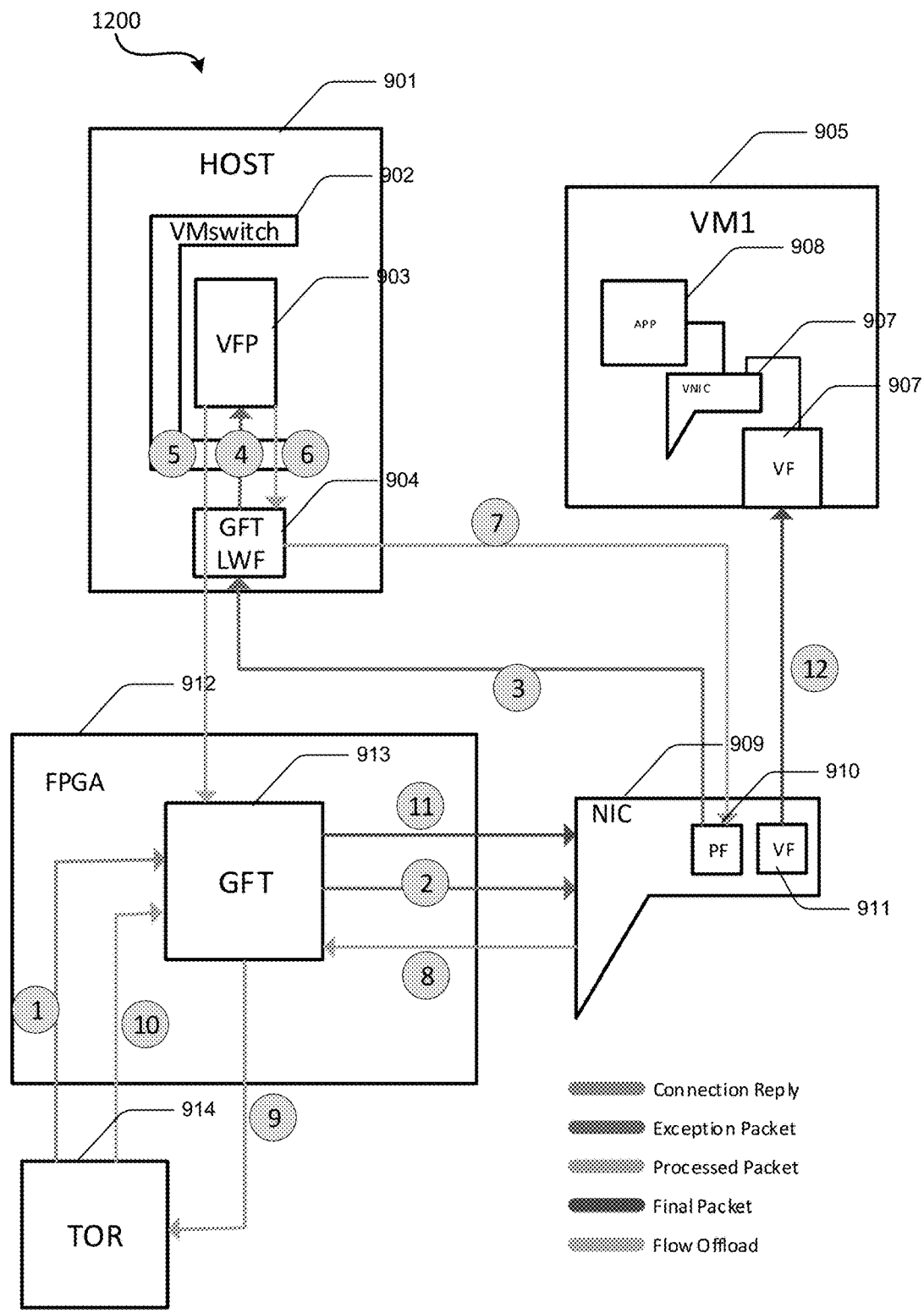
FIG. 12 is a diagram illustrating RDMA implementation in a virtualized environment in accordance with the present disclosure.

FIG. 12 illustrates an example inbound RDMA connection reply. (1) A packet comes in from TOR 914 and is forwarded to FPGA 912. An exception path may be executed. (2) GFT 913 determines that it does not contain a matching rule for this packet, and marks the packet as an exception packet (VLAN TAG) and sends the packet to NIC 909. (3) The exception is processed by NIC 909 and NIC 909 sends the packet to GFT LWF 904 via the PF 911. (4)

GFT LWF 904 removes the VLAN tag and marks the packet as an exception before sending it to VFP 903. (5) VFP 903 parses the packet, creates an IN UF, and offloads this flow to GFT 913 via GFT LWF 904. (6) After the UF is successfully offloaded to the GFT 913, VFP 903 sends the packet to GFT LWF 904 without applying actions to the packet. (7) GFT LWF 904 marks the packet as processed by adding a VLAN tag and then sends the packet to NIC 909. (8) NIC 909 removes the OOB data before forwarding it to FPGA 912. (9) GFT 913. (10) TOR 914 then sends the packet back to FPGA 912. (11) At this point, GFT 913 has the matching UF for this packet so it applies the actions to the packet and sends the packet to the NIC 909. (12) NIC 909 then forwards the packet to the VM via the VF 907.

Figure 13:
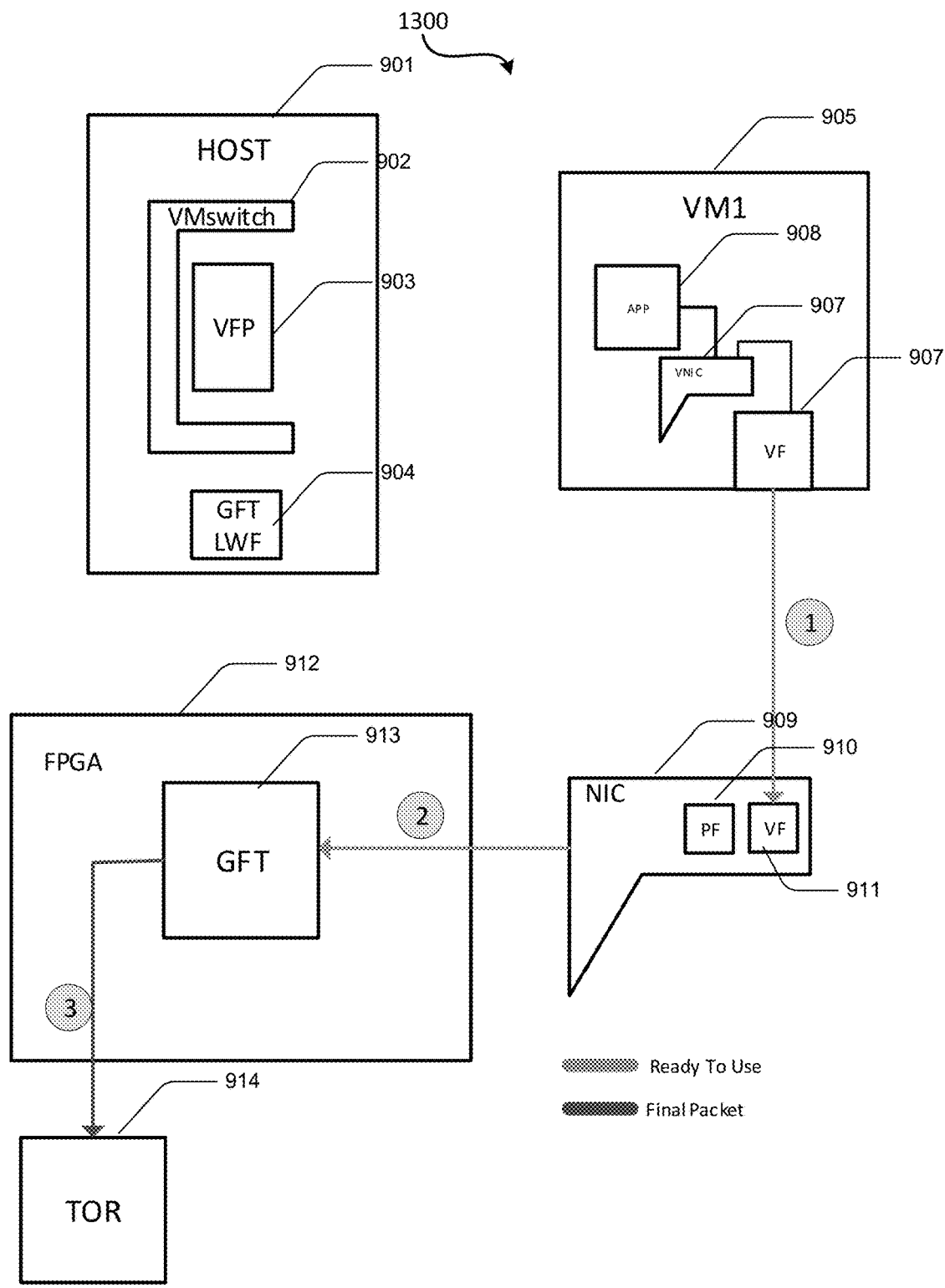
FIG. 13 is a diagram illustrating RDMA implementation in a virtualized environment in accordance with the present disclosure.

FIG. 13 illustrates an example outbound RDMA Packet Flow, indicating outbound ready-to-use. (1) A ready-to-use RDMA packet is sent to NIC 909 from VM1 905 via its VF 907. (2) NIC 909 forwards the packet to GFT 913. (3) Now that GFT 913 has an OUT UF entry that matches this packet, it applies actions to the packet and sends it off to the TOR 914.

Figure 14:
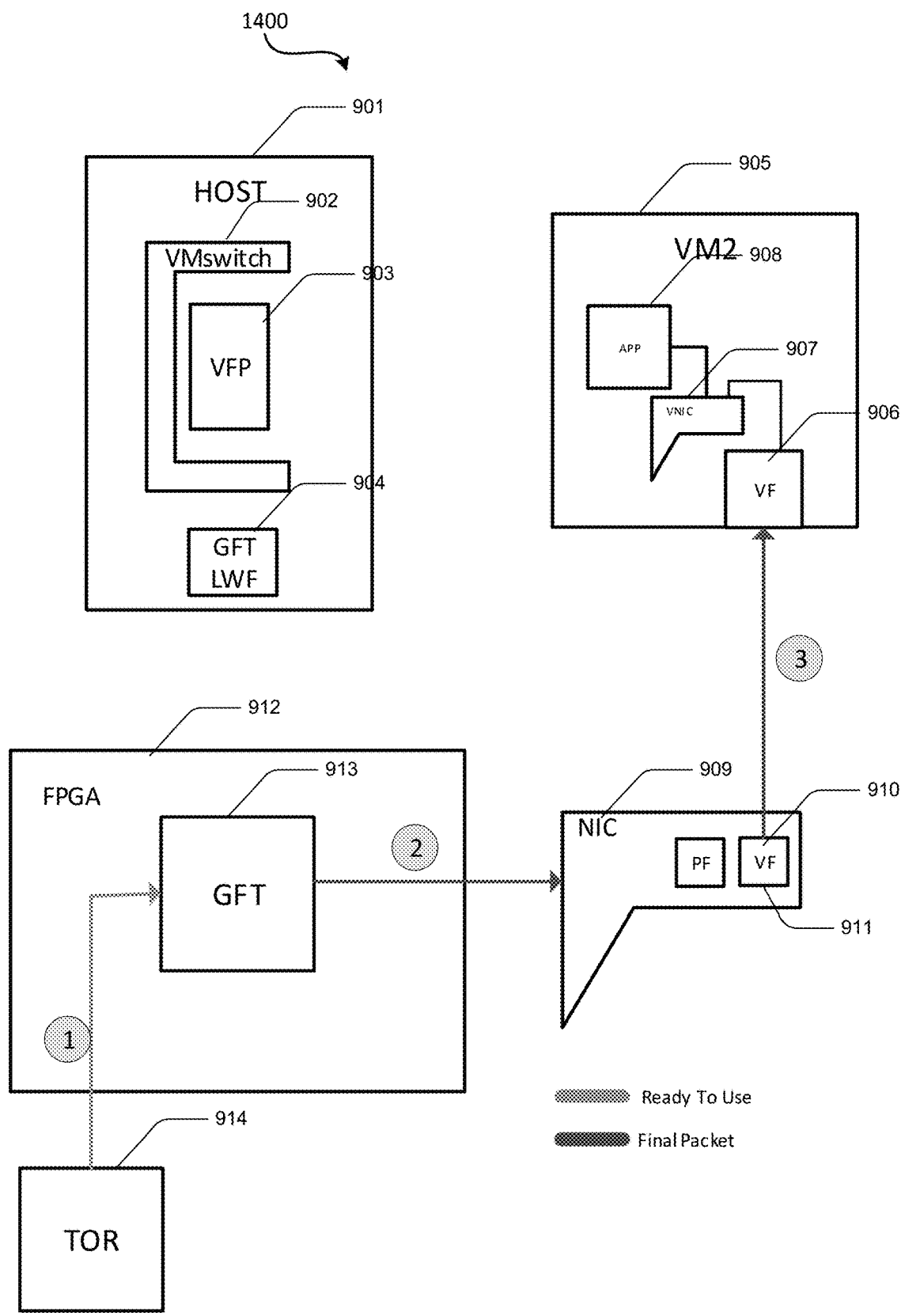
FIG. 14 is a diagram illustrating RDMA implementation in a virtualized environment in accordance with the present disclosure.

FIG. 14 illustrates an example inbound RDMA packet flow for ready-to-use. (1) TOR 914 sends a packet to FPGA 912. (2) GFT 913 has a matching entry for this packet, so it applies actions and sends it to the NIC 909. NIC 909 then forwards the packet to the correct VM via its VF 907. Now that an RDMA connection has been established between the two VMs and respective OUT/IN UFs have been created and exist in each host machine's GFT 913, RDMA traffic between the two VMs is enabled.

Figure 15:
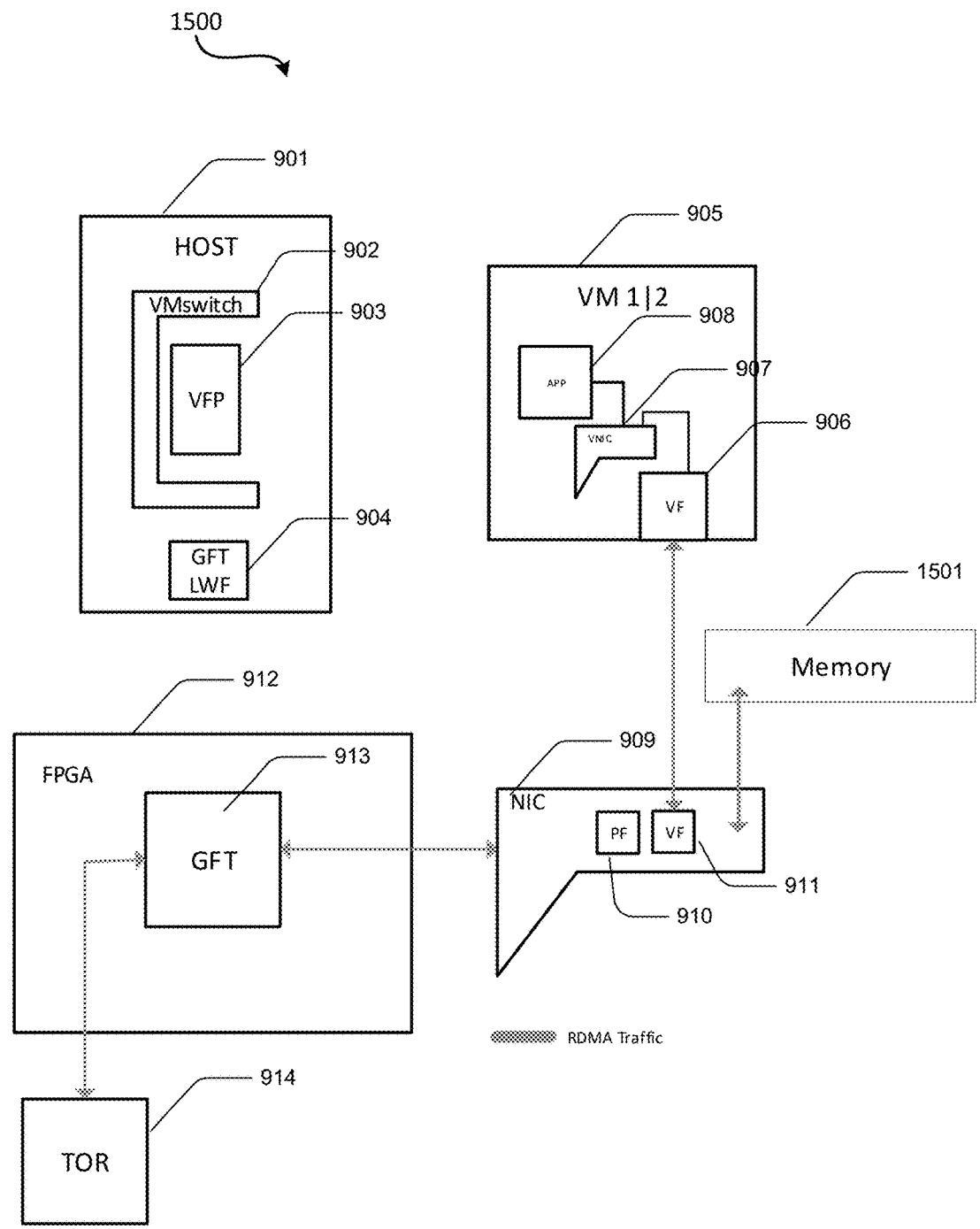
FIG. 15 is a diagram illustrating RDMA implementation in a virtualized environment in accordance with the present disclosure.

FIG. 15 illustrates RDMA Traffic between VM1 905 and VM2. If an RMDA packet comes from the TOR 914 with source VM 1|2 and destination VM 1|2, then the GFT 913 will have an entry for it, process the packet, send it to the NIC 909, and the NIC 909 will write data to memory or forward the packet to the correct VM.

Figure 16:
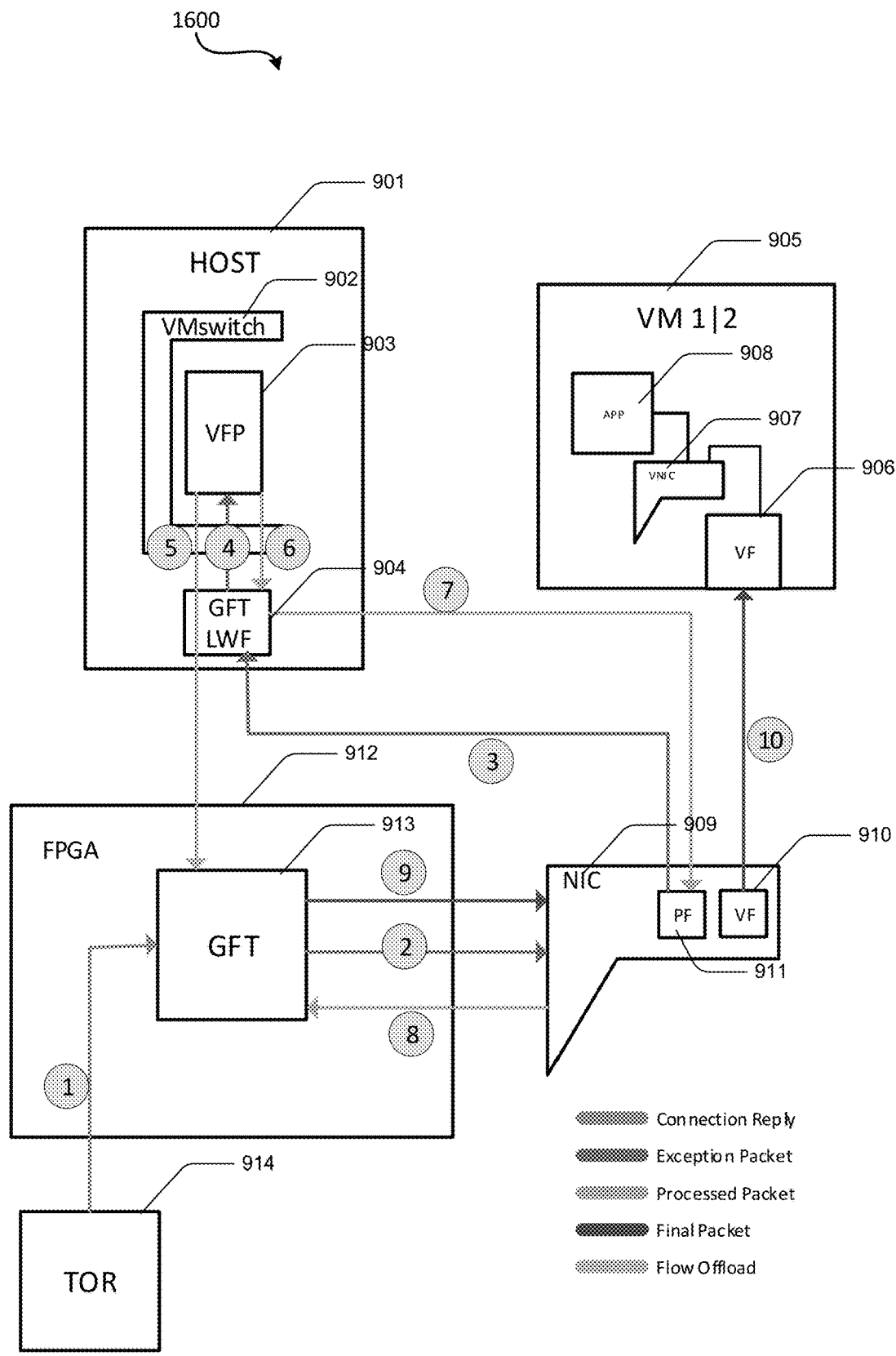
FIG. 16 is a diagram illustrating RDMA implementation in a virtualized environment in accordance with the present disclosure.

For egress packets with no matching rules in GFT 913, the FPGA 912 may send the packets back to TOR 914 and then from TOR 914 to FPGA 912 to NIC 909. In some implementations, the packets must reach the VM from the NIC 909 and not the VM Bus, and the FPGA 912 hardware may not support forwarding a packet from NIC PF 911 to NIC VF 907. In some embodiments, TOR 914 may bounce back the packet, allow the GFT 913 to process it, and then send it to the VM via the NIC 909. In other embodiments where FPGA 912 no longer has this limitation, the inbound packet flow may be as depicted in FIG. 16 which illustrates an inbound RMDA packet without TOR 914 bounce. (1) RDMA packet arrives from TOR 914 to FGPA 912. (2) GFT 913 does not have a matching rule for the packet, so it marks it as an exception with a VLAN Tag and sends it to NIC 909. (3) NIC 909 sends it to GFT LWF 904 via PF 911. (4) GFT LWF 904 removes the VLAN Tag and marks the packet as exception before sending it to VFP 903. (5) VFP 903 processes the packet, creates in IN UF, and then offloads the UF to GFT 913 via GFT LWF 904. (6) VFP 903 applies the actions to the packet, marks it as processed, and sends it to GFT LWF 904. (7) GFT LWF 904 marks the packet as processed with a special VLAN Tag and sends it to NIC 909. (8) NIC 909 forwards it to FPGA 912. (9) GFT 913 notes the special VLAN Tag, removes it, and sends it back to NIC 909. (10) NIC 909 then forwards the packet to the VM.

Figure 17:
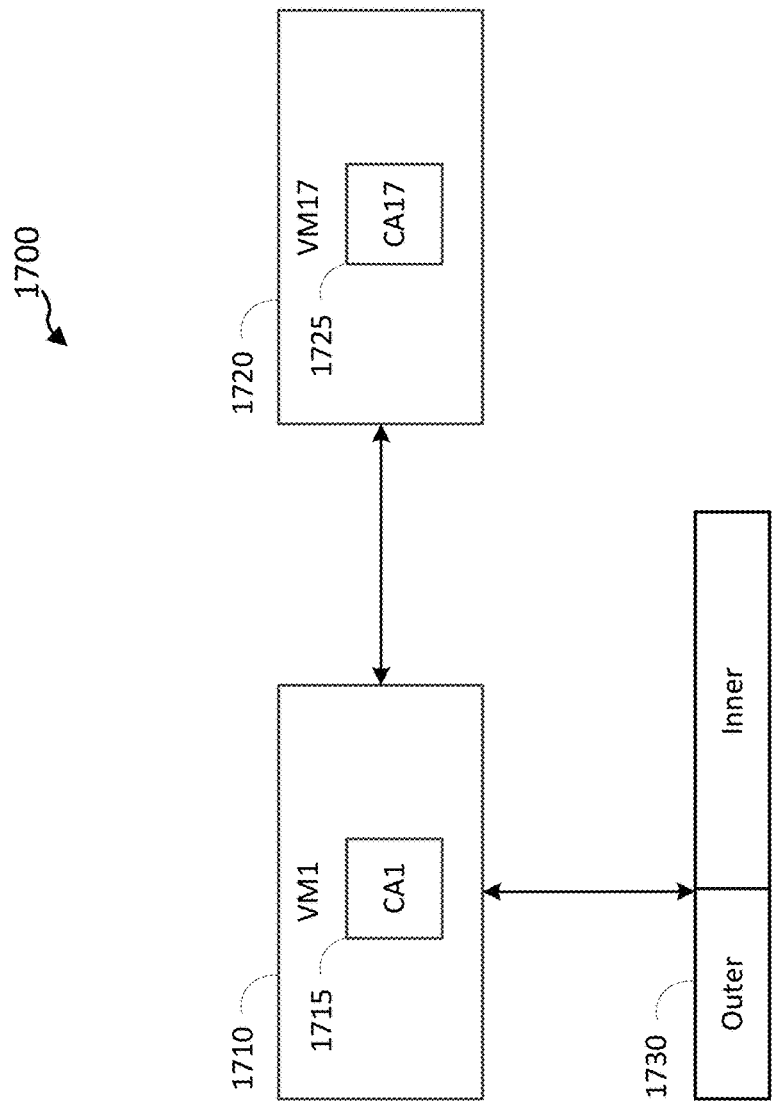
FIG. 17 is a diagram illustrating RDMA implementation in a virtualized environment in accordance with the present disclosure.

FIG. 17 illustrates an example virtualized environment 1700 that includes a first virtual machine 1710 and a second virtual machine 1720. The first virtual machine 1710 may be associated with a first customer address 1715, and the second virtual machine 1720 may be associated with a second customer address 1725. The first customer address 1715 and the second customer address 1725 may be known and used by the customers or users of the first virtual machine 1710 and the second virtual machine 1720. However, when data is sent over the network, the virtualized environment 1700 may encapsulate data packets which may specify customer-known address with those that may be used by the virtualized environment 1700. As shown in FIG. 13, data packet 1730 shows an inner packet that may include customer specific destination and source addresses, which may be encapsulated with an outer header that specifies source and destination addresses that are implemented by the virtualized environment 1700 but may not be known by the customers of the first virtual machine 1710 and the second virtual machine 1720.

Figure 18:
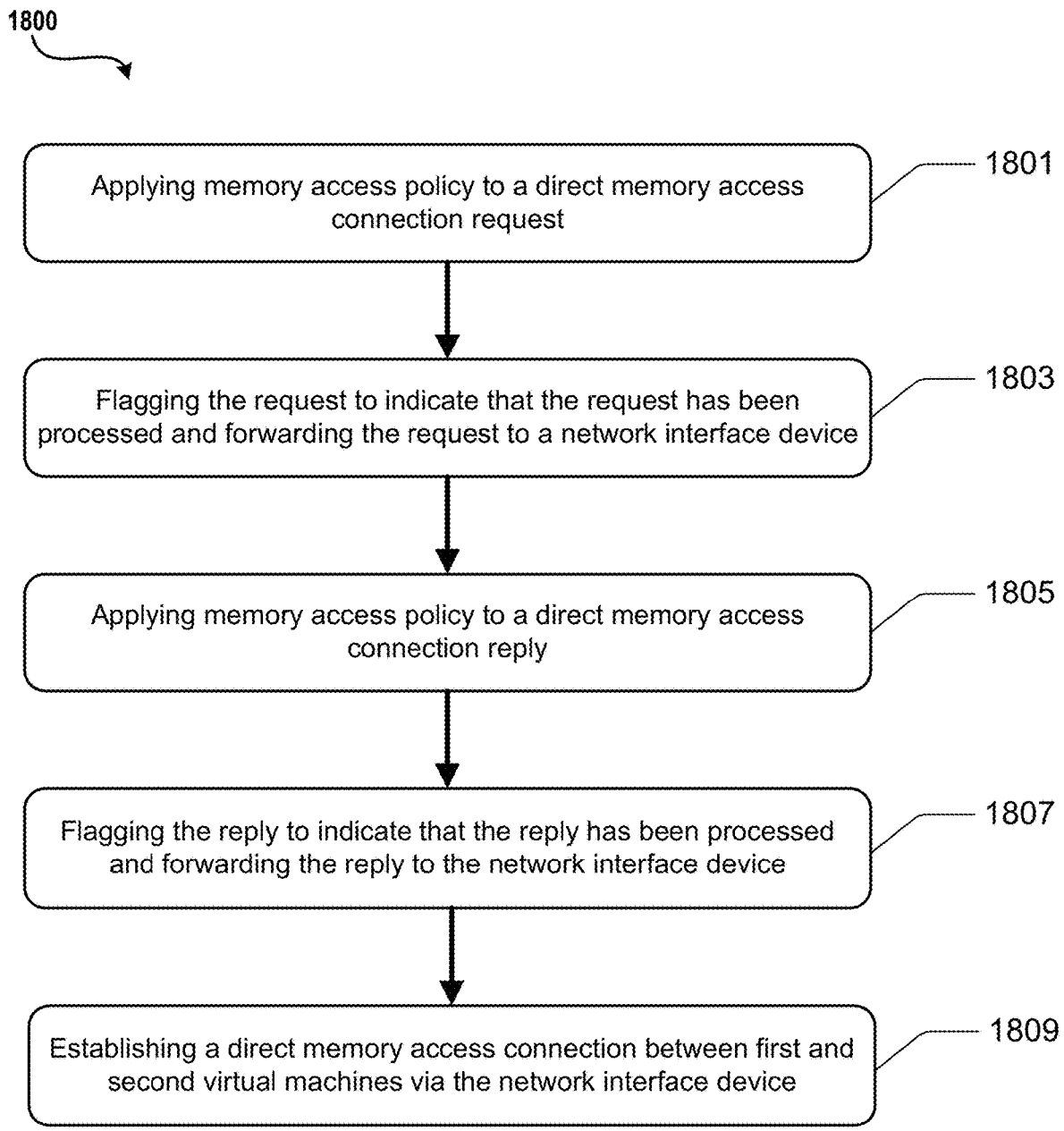
FIG. 18 is a flowchart depicting an example procedure for direct memory access in accordance with the present disclosure.

Turning now to FIG. 18, illustrated is an example operational procedure for direct memory access in a virtualized computing environment in accordance with the present disclosure. The operational procedure may be implemented in a system comprising one or more computing devices. Referring to FIG. 6, operation 1801 illustrates applying at least one memory access policy of the virtualized computing environment to a direct memory access connection request received from a first virtual machine via an exception path configured to process the connection request for direct memory access handling between the first virtual machine and a second virtual machine.

Operation 1801 may be followed by operation 1803. Operation 1803 illustrates flagging the request to indicate that the request has been processed and forwarding the request to a network interface device configured to execute direct memory access network functions between virtual machines.

Operation 1803 may be followed by operation 1805. Operation 1805 illustrates applying at least one memory access policy of the virtualized computing environment to a direct memory access connection reply received from the second virtual machine on the exception path.

Operation 1805 may be followed by operation 1807. Operation 1807 illustrates flagging the reply to indicate that the reply has been processed and forwarding the reply to the network interface device.

Operation 1807 may be followed by operation 1809. Operation 1809 illustrates establishing a direct memory access connection between first and second virtual machines via the network interface device.

Figure 19:
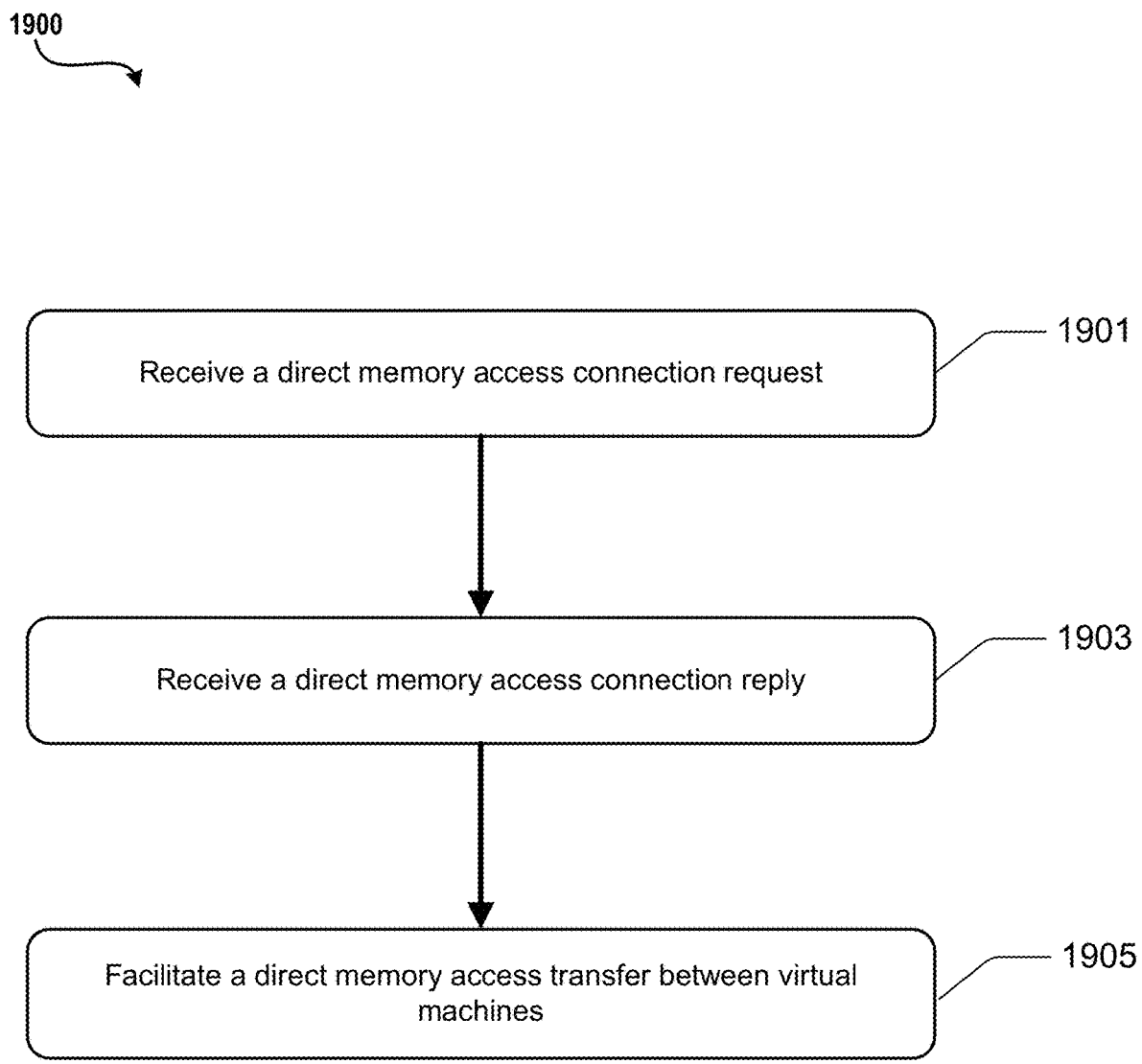
FIG. 19 is a flowchart depicting an example procedure for direct memory access in accordance with the present disclosure.

Referring to FIG. 19, illustrated is another example operational procedure for direct memory access in a virtualized computing environment. The operational procedure may be implemented in a network interface device. The network interface device may include programmable logic that, when executed by the network interface device, cause the network interface device to perform the described operations comprising. Referring to FIG. 19, operation 1901 illustrates receiving a direct memory access connection request that was processed to apply a memory access policy of a virtualized computing environment and flagged to indicate that the request has been processed, the request processed via an exception path configured to process the connection request for direct memory access handling between the first virtual machine and a second virtual machine.

Operation 1901 may be followed by operation 1903. Operation 1903 illustrates receiving a direct memory access connection reply that has been processed via the exception path and flagged to indicate that the reply has been processed.

Operation 1903 may be followed by operation 1905. Operation 1905 illustrates facilitating a direct memory access data transfer between one or more virtual machines of the virtualized computing environment based at least in part on the processed direct memory access connection request and direct memory access connection reply.

Operation 1905 may be followed by operation 1907. Operation 1907 illustrates flagging the reply to indicate that the reply has been processed and forwarding the reply to the network interface device.

Operation 1907 may be followed by operation 1909. Operation 1909 illustrates establishing a direct memory access connection and allowing the network interface device to facilitate a direct memory access data transfer between one or more virtual machines of the virtualized computing environment.

EXAMPLE CLAUSES

The disclosure presented herein may be considered in view of the following clauses.

Example Clause A, a method for direct memory access in a virtualized computing environment comprising one or more computing devices, the method comprising:

applying at least one memory access policy of the virtualized computing environment to a direct memory access connection request received from a first virtual machine via an exception path configured to process the connection request for direct memory access handling between the first virtual machine and a second virtual machine;

flagging the request to indicate that the request has been processed and forwarding the request to a network interface device configured to execute direct memory access network functions between virtual machines;

applying at least one memory access policy of the virtualized computing environment to a direct memory access connection reply received from the second virtual machine on the exception path;

flagging the reply to indicate that the reply has been processed and forwarding the reply to the network interface device; and establishing a direct memory access connection between first and second virtual machines via the network interface device.

Example Clause B, the method of Example Clause A, wherein the network interface device comprises a field programmable gate array (FPGA) configured to perform at least routability tasks.

Example Clause C, the method of any one of Example Clauses A through B, wherein the direct memory access comprises RDMA.

Example Clause D, the method of any one of Example Clauses A through C, wherein the FPGA is configured to perform operations of Generic Flow Tables (GFTs) to encapsulate an address space from a virtual network and with physical space addresses.

Example Clause E, the method of any one of Example Clauses A through D, wherein the FPGA is programmed to implement a function to process packets and send the processed packets to the network interface device.

Example Clause F, the method of any one of Example Clauses A through E, wherein the memory access policy is applied by a virtual filtering platform.

Example Clause G, the method of any one of Example Clauses A through F, wherein the request and the reply are marked as an exception by adding a VLAN tag.

Example Clause H, the method of any one of Example Clauses A through G, further comprising applying a filter that augments the network interface device and is configured to abstract details of the network interface device and FPGA.

Example Clause I, a network interface device, comprising programmable logic that, when executed by the network interface device, cause the network interface device to perform operations comprising:

receive a direct memory access connection request that was processed to apply a memory access policy of a virtualized computing environment and flagged to indicate that the request has been processed, the request processed via an exception path configured to process the connection request for direct memory access handling between the first virtual machine and a second virtual machine;

receive a direct memory access connection reply that has been processed via the exception path and flagged to indicate that the reply has been processed; and facilitate a direct memory access data transfer between one or more virtual machines of the virtualized computing environment based at least in part on the processed direct memory access connection request and direct memory access connection reply.

Example Clause J, the network interface device of Example Clause I, wherein the network interface device comprises a field programmable gate array (FPGA) configured to perform at least some direct memory access tasks.

Example Clause K, the network interface device of any one of Example Clauses I through J, wherein the direct memory access comprises RDMA.

Example Clause L, the network interface device of any one of Example Clauses I through K, wherein the FPGA is configured to perform operations of Generic Flow Tables (GFTs) to encapsulate an address space from a virtual network and with physical space addresses.

Example Clause M, the network interface device of any one of Example Clauses I through L, wherein the FPGA is programmed to implement a function to process packets and send the processed packets to the network interface device.

Example Clause N, the network interface device of any one of Example Clauses I through M, wherein the memory access policy is applied by a virtual filtering platform.

Example Clause O, the network interface device of any one of Example Clauses I through N, wherein the request and the reply are marked as an exception by adding a VLAN tag.

Example Clause P, the network interface device of any one of Example Clauses I through O, further comprising applying a filter that augments the network interface device and is configured to abstract details of the network interface device and FPGA.

Example Clause Q, a system, comprising:

one or more processors; and a memory in communication with the one or more processors, the memory having computer-readable instructions stored thereupon that, when executed by the one or more processors, cause the system to perform operations comprising:

applying a memory access policy of a virtualized computing environment to a direct memory access connection request received from a first virtual machine via an exception path configured to process the connection request for direct memory access handling between the first virtual machine and a second virtual machine;

flagging the request to indicate that the request has been processed and forwarding the request to a network interface device configured to execute direct memory access network functions between virtual machines of the virtualized computing environment;

applying the memory access policy to a direct memory access connection reply received from a second virtual machine on the exception path;

flagging the reply to indicate that the reply has been processed and forwarding the reply to the network interface device; and establishing a direct memory access connection by allowing the network interface device to cause data transfer between first and second virtual machines.

Example Clause R, the system of Example Clause Q, wherein the request and the reply are marked as an exception by adding a VLAN tag.

Example Clause S, the system of any of Example Clauses Q through R, wherein the reserved bit propagated to the physical level header.

Example Clause T, the system of any one of Example Clauses Q through S, wherein the direct memory access connection request and the direct memory access connection reply are received via an exception path.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 20:
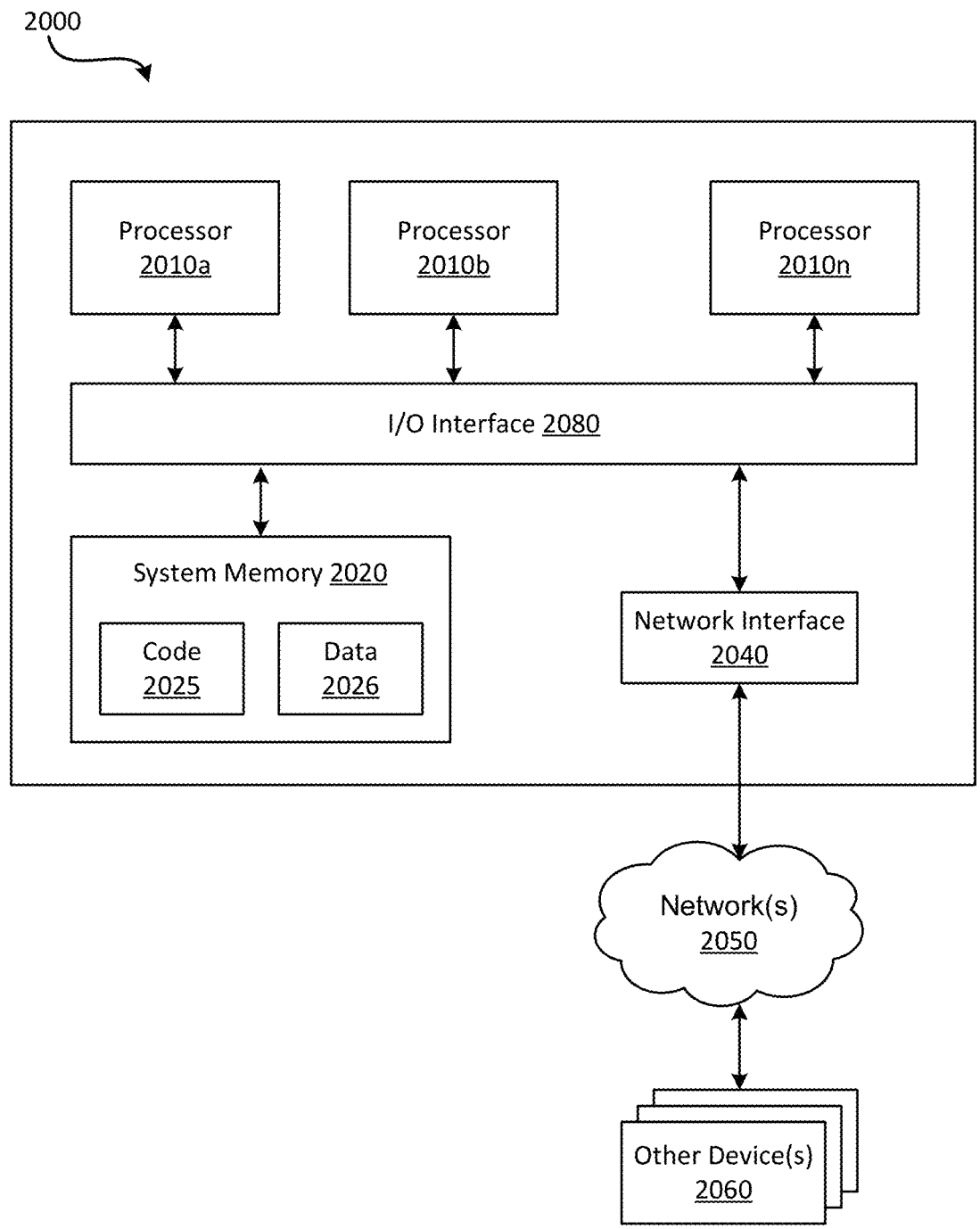
FIG. 20 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 20 illustrates such a general-purpose computing device 2000. In the illustrated embodiment, computing device 2000 includes one or more processors 2010a, 2010b, and/or 2010n (which may be referred herein singularly as "a processor 2010" or in the plural as "the processors 2010") coupled to a system memory 2020 via an input/output (I/O) interface 2030. Computing device 2000 further includes a network interface 2040 coupled to I/O interface 2030.

In various embodiments, computing device 2000 may be a uniprocessor system including one processor 2010 or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x206, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 2020 as code 2025 and data 2026.

In one embodiment, I/O interface 2030 may be configured to coordinate I/O traffic between the processor 2010, system memory 2020, and any peripheral devices in the device, including network interface 2040 or other peripheral interfaces. In some embodiments, I/O interface 2030 may perform any necessary protocol, timing, or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components. Also, in some embodiments some or all of the functionality of I/O interface 2030, such as an interface to system memory 2020, may be incorporated directly into processor 2010.

Network interface 2040 may be configured to allow data to be exchanged between computing device 2000 and other device or devices 2060 attached to a network or network(s) 2050, such as other computer systems or devices as illustrated in FIGS. 1 through 4, for example. In various embodiments, network interface 2040 may support communication via any suitable wired or wireless general data networks, such as types of Ethernet networks, for example. Additionally, network interface 2040 may support communication via telecommunications/telephony networks such as analog voice networks or digital fiber communications networks, via storage area networks such as Fibre Channel SANs or via any other suitable type of network and/or protocol.

In some embodiments, system memory 2020 may be one embodiment of a computer-accessible medium configured to store program instructions and data as described above for FIGS. 1-19 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 2000 via I/O interface 2030. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 2000 as system memory 2020 or another type of memory. Further, a computer-accessible medium may include transmission media or signals such as electrical, electromagnetic or digital signals, conveyed via a communication medium such as a network and/or a wireless link, such as may be implemented via network interface 2040. Portions or all of multiple computing devices, such as those illustrated in FIG. 20, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for direct memory access in a virtualized computing environment comprising one or more computing devices, the method comprising:
    applying at least one memory access policy of the virtualized computing environment to a direct memory access connection request received from a first virtual machine via an exception path configured to process the connection request for direct memory access handling between the first virtual machine and a second virtual machine;
    flagging the request to indicate that the request has been processed and forwarding the request to a network interface device configured to execute direct memory access network functions between virtual machines;
    applying at least one memory access policy of the virtualized computing environment to a direct memory access connection reply received from the second virtual machine on the exception path;
    flagging the reply to indicate that the reply has been processed and forwarding the reply to the network interface device; and
    establishing a direct memory access connection between first and second virtual machines via the network interface device.

2. The method of claim 1, wherein the network interface device comprises a field programmable gate array (FPGA) configured to perform at least routability tasks.

3. The method of claim 1, wherein the direct memory access comprises RDMA.

4. The method of claim 2, wherein the FPGA is configured to perform operations of Generic Flow Tables (GFTs) to encapsulate an address space from a virtual network and with physical space addresses.

5. The method of claim 2, wherein the FPGA is programmed to implement a function to process packets and send the processed packets to the network interface device.

6. The method of claim 1, wherein the memory access policy is applied by a virtual filtering platform.

7. The method of claim 1, wherein the request and the reply are marked as an exception by adding a VLAN tag.

8. The method of claim 1, further comprising applying a filter that augments the network interface device and is configured to abstract details of the network interface device and FPGA.

9. A network interface device, comprising:
    programmable logic that, when executed by the network interface device, cause the network interface device to perform operations comprising:
    receive a direct memory access connection request that was processed to apply a memory access policy of a virtualized computing environment and flagged to indicate that the request has been processed, the request processed via an exception path configured to process the connection request for direct memory access handling between the first virtual machine and a second virtual machine;
    receive a direct memory access connection reply that has been processed via the exception path and flagged to indicate that the reply has been processed; and
    facilitate a direct memory access data transfer between one or more virtual machines of the virtualized computing environment based at least in part on the processed direct memory access connection request and direct memory access connection reply.

10. The network interface device of claim 9, wherein the programmable logic comprises a field programmable gate array (FPGA) configured to perform at least some direct memory access tasks.

11. The network interface device of claim 9, wherein the direct memory access comprises RDMA.

12. The network interface device of claim 10, wherein the FPGA is configured to perform operations of Generic Flow Tables (GFTs) to encapsulate an address space from a virtual network and with physical space addresses.

13. The network interface device of claim 10, wherein the FPGA is programmed to implement a function to process packets and send the processed packets to the network interface device.

14. The network interface device of claim 9, wherein the memory access policy is applied by a virtual filtering platform.

15. The network interface device of claim 9, wherein the request and the reply are marked as an exception by adding a VLAN tag.

16. The network interface device of claim 9, further comprising applying a filter that augments the network interface device and is configured to abstract details of the network interface device and FPGA.

17. A system, comprising:
    one or more processors; and
    a memory in communication with the one or more processors, the memory having computer-readable instructions stored thereupon that, when executed by the one or more processors, cause the system to perform operations comprising:
    applying a memory access policy of a virtualized computing environment to a direct memory access connection request received from a first virtual machine via an exception path configured to process the connection request for direct memory access handling between the first virtual machine and a second virtual machine;
    flagging the request to indicate that the request has been processed and forwarding the request to a network interface device configured to execute direct memory access network functions between virtual machines of the virtualized computing environment;

applying the memory access policy to a direct memory access connection reply received from a second virtual machine on the exception path;

flagging the reply to indicate that the reply has been processed and forwarding the reply to the network interface device; and establishing a direct memory access connection by allowing the network interface device to cause data transfer between first and second virtual machines.

18. The system of claim 17, wherein the request and the reply are marked as an exception by adding a VLAN tag.

19. The system of claim 17, further comprising applying a filter that augments the network interface device and is configured to abstract details of the network interface device and FPGA.

20. The system of claim 17, wherein the direct memory access connection request and the direct memory access connection reply are received via an exception path.

* * * * *